United States Patent [19]

Gallant et al.

[11] 3,798,611

[45] Mar. 19, 1974

[54] INTEGRATED PUSH BUTTON PANEL FOR CONTROLLING AIRCRAFT INSTRUMENTALITIES

[75] Inventors: Reginald R. Gallant, Hartford; Roger S. Swain, Wolcott; Neil S. Waterman, Stamford, all of Conn.

[73] Assignee: Atlantic Design & Development Corporation, Stamford, Conn.

[22] Filed: June 30, 1972

[21] Appl. No.: 165,829

Related U.S. Application Data

[62] Division of Ser. No. 835,164, June 20, 1969, Pat. No. 3,701,945.

[52] U.S. Cl. .............................................. 340/172.5
[51] Int. Cl. .............................................. G06f 3/00
[58] Field of Search .................. 340/172.5; 235/151

[56] References Cited

UNITED STATES PATENTS

| | | | |
|---|---|---|---|
| 3,579,196 | 5/1971 | Gregg, Jr. et al. | 340/172.5 |
| 3,656,131 | 4/1972 | Libby et al. | 340/172.5 |
| 3,142,820 | 7/1964 | Daniels | 340/172.5 |

*Primary Examiner*—Raulfe B. Zache
*Attorney, Agent, or Firm*—Buckles and Bramblett

[57] ABSTRACT

A panel for controlling a plurality of instruments has a centrally disposed numerical keyboard of eleven push buttons and a plurality of digital display means, one display connected with the keyboard to indicate the sequence in which the numerical push buttons have been manipulated, each of the other display means connected with one of the instruments to indicate the digital data by which it is controlled. Digital memory storage units are associated with the keyboard and with each instrument. Switching means on the control panel enables the selected numerical setting in the keyboard storage unit to be transferred to any of the other display means, while servo means directs each instrument to respond to the digital data registered in its digital memory storage unit, as may be shown by its associated display. The eleventh push button serves to clear the keyboard and its associated digital display.

4 Claims, 26 Drawing Figures

GATE AND LATCH

| | 100's | 10's | 1's | 0.1's | 0.01's | LATCH |
|---|---|---|---|---|---|---|
| $Q_1$ | 1 | 0 | 1 | 0 | 1 | 0 |
| $\bar{Q}_1$ | 0 | 1 | 0 | 1 | 0 | 1 |
| $Q_2$ | 1 | 1 | 0 | 0 | 1 | 1 |
| $\bar{Q}_2$ | 0 | 0 | 1 | 1 | 0 | 0 |
| $Q_3$ | 1 | 1 | 1 | 1 | 0 | 0 |
| $\bar{Q}_3$ | 0 | 0 | 0 | 0 | 1 | 1 |

PATENTED MAR 19 1974 3,798,611

INTEGRATED PUSH BUTTON PANEL FOR CONTROLLING AIRCRAFT INSTRUMENTALITIES

This application is a division of copending application Ser. No. 835,164 filed June 20, 1969, now U.S. Pat. No. 3,701,945 issued Oct. 31, 1972.

BACKGROUND OF THE INVENTION

The invention relates to an improved system for controlling a plurality of radio, electronic or other instrumentalities by means of a compact digital keyboard, and for visually displaying the numerical setting controlling each. In the preferred embodiment disclosed the invention is adapted to the control of aircraft radio communications and navigation apparatus, and provides a compact control and display panel which may be centrally disposed on an aircraft instrument board for easy and convenient access by either the aircraft pilot or co-pilot. The radio apparatus which is controlled from the panel need not be located behind the instrument board but may be installed anywhere that space may be found available within the aircraft, even in the tail of the fuselage if desired.

One of the problems attendant to flying modern aircraft equipped with multiple radio transmitters and receivers employed for communications with various ground stations, or with other aircraft, and for navigation with the numerous navigational radio-aids including radio ranges, radio marker beacons, radio direction finders and a multiplicity of criss-crossing omni-directional-ranges, is the necessity for frequently changing from one frequency setting to another -- and back and forth between different frequencies. The prior art tuning means for aircraft radio equipment has generally employed rotatable dials affixed to tuning shafts, sometimes with a gear reduction to facilitate fine tuning, but all such tuning means are difficult to operate quickly and accurately, especially under conditions of turbulance or when flying on instruments. Accuracy of tuning with dial controls may also be affected by parallax due to the angle at which the operator must view the dial. When cold weather requires the wearing of gloves, dial tuning becomes all the more cumbersome and less accurate. It is to be understood that the control means of the invention may also be extended to control such variable parameters as engine speed, propeller pitch, flap angle, altitude and course heading.

Accordingly a principal object of the present invention is to provide means for digital control of apparatus by a simple keyboard of push buttons, which need not exceed ten in number, and which may be arranged in the same pattern as the familiar touch-tone telephone controls.

Another object is to provide digital display means connectable with each apparatus or other instrument to be controlled, and operable by the push button keyboard, to clearly and positively indicate the exact digital control data selected for for each instrumentality with complete elimination of parallex in viewing.

A further object is to provide a control system in which a series of digits sequentially selected by manipulation of a numerical keyboard may be stored and displayed, and subsequently transferred by a single switch operation to any one of a plurality of instruments.

A more specific object is to provide means for digital tuning of radio apparatus by push button keyboard control with digital display of the selected frequency setting.

An additional object is to provide digital memory storage means associated with each instrument whereby the frequency to which it has been previously tuned in recorded in digital form and may be recalled for presentation on a visual display by the simple operation of a single switch or push button.

Other objects of the invention will in part be obvious and will in part appear hereinafter.

The invention accordingly comprises the features of construction, combinations of elements, and arrangements of parts which will be exemplified in the constructions hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which:

FIG. 6C is a schematic diagram of the gate and latch section of the control circuits;

FIG. 7 is a block diagram showing the manner in which FIG. 6A, FIG. 6B and FIG. 6C are to be connected together to form a complete circuit;

FIG. 8 is a "Truth Table" showing the gate conditions existing following each shift input signal as applied to the shift control circuit of FIG. 6B;

FIG. 10 is a block diagram showing the manner in which FIGS. 9A and 9B are to be connected;

GENERAL DESCRIPTION

Figure 1:
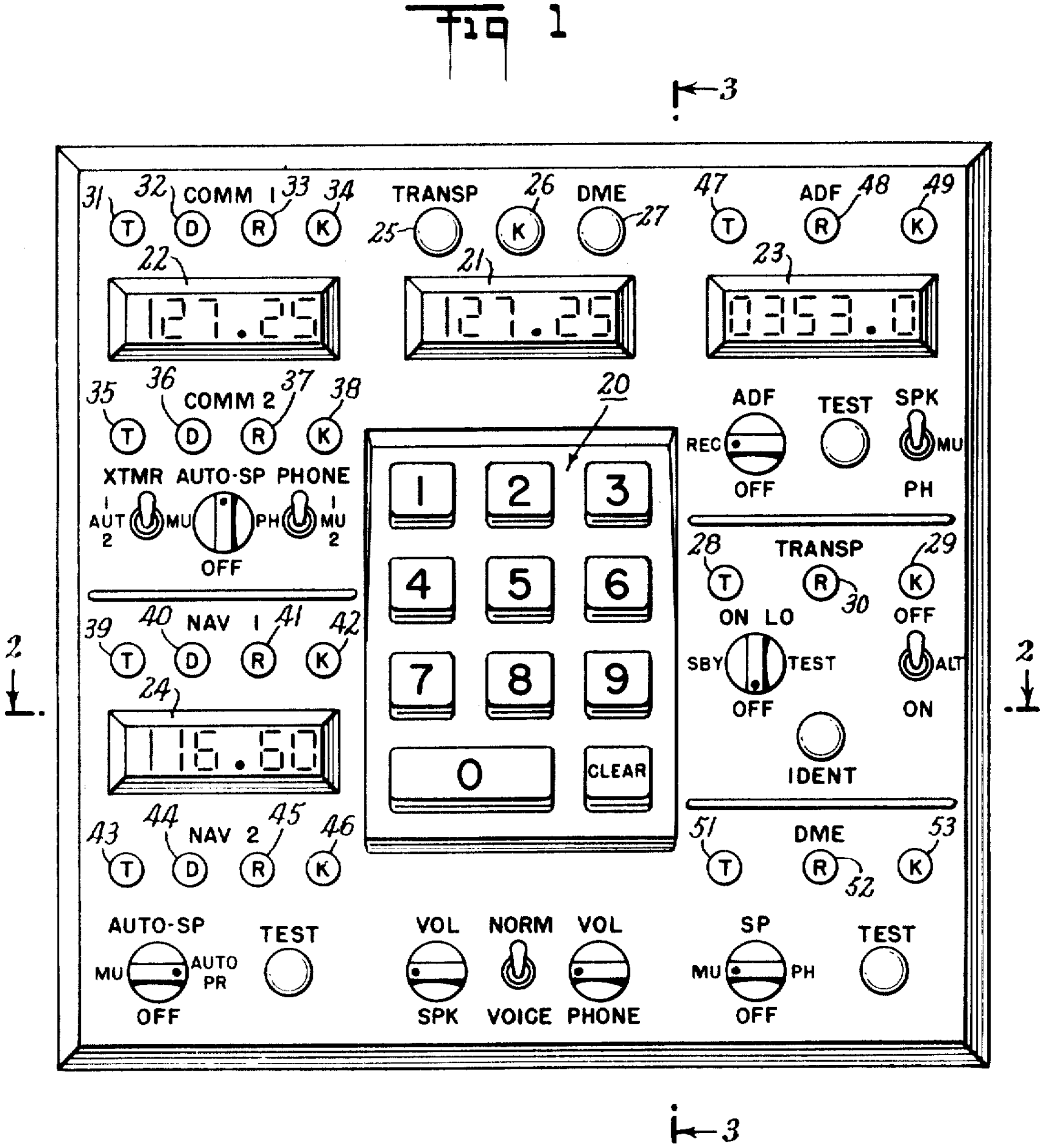
FIG. 1 is a front plan view of an aircraft radio control panel according to a preferred embodiment of the invention.
Figure 2:
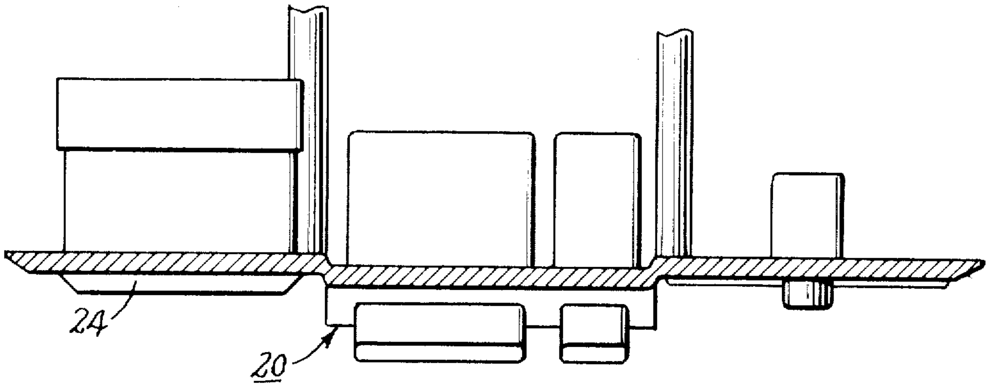
FIG. 2 is a cross-sectional view of the panel of FIG. 1 taken along the line 2—2 in FIG. 1.

The system of the invention, as disclosed in one embodiment herein, enables an operator to "punch-in" any desired frequency setting by selectively and sequentially depressing the numerical push buttons of the keyboard. As each button is pressed its numerical character appears in the center window of the illuminated display, immediately above the keyboard. Each successive operation of a different numerical button causes a shift to the next digit, advancing from left to right, until all digits have been registered and displayed. The displayed keyboard number may now be transferred to any one or more of the instruments which are to be controlled, by simply depressing a transfer button associated with each radio set. The number registered in the keyboard display is automatically transferred to a solid state memory unit associated with the particular radio instrument, thereby setting up the switching circuitry to tune the selected radio to the selected frequency. Meanwhile the selected number remains set in the keyboard memory, until such time as the "clear" button of the keyboard is depressed. The transfer buttons and the numerical buttons of the keyboard are preferably of the spring loaded momentary contact type.

The input section of the control system comprises the keyboard, a keyboard digital storage unit and a digital display section. The display section has the capability of either displaying the information which is stored in the keyboard storage section or to be connected to either the distance measuring equipment (DME) or the transponder control output so that the frequency of these other communication units may be displayed. It is possible therefore to transfer information from the keyboard storage unit to any one of the other communication equipments even when the input section (keyboard storage) information is not being displayed on the so-called keyboard display section.

A "display" switch button of the latching type is associated with each communication and navigation radio on the control panel, as is also a "keyboard" switch button and a "recall" button. A solid state memory device associated with each communications radio unit stores the frequency setting transfer from the keyboard memory unit and enables each radio to be returned to this frequency by simple operation of the recall button after a temporary selection of the keyboard display frequency. The normal operation for temporary frequency setting is for the pilot to depress the K (keyboard) button associated with the specific piece of equipment such as Comm 1 which would then connect the radio to the keyboard storage section and disconnect it from the Comm 1 storage section. It is not necessary for the display to be displaying the frequency of Comm 1 when this occurs; for instance, the display button may be showing the Comm 2 frequency and it would still be possible for the pilot to introduce the stored keyboard information temporarily into the Comm 1 radio set. If it should be desired that only the communication equipment whose frequency was displayed were capable of being connected to the keyboard storage unit, then it would be possible to interlock mechanically the D and K buttons so that this would be the case. Thus the system provides flexibility to alter the frequency desired without losing a previously selected frequency. This is particularly useful if the operator desires to switch briefly from a principal communications frequency to another frequency for weather, tower, or range communication.

The system for controlling radio navigation apparatus is essentially the same as that for control of radio communication equipment. Thus the visual display system for automatic direction finding (ADF) is a single digital display window in which the selected ADF frequency appears in response to setting transferred from the numerical keyboard. Frequency setting of the distance measuring equipment (DME) and the transponder are also accomplished by the central keyboard. Push buttons immediately above the keyboard (as shown in FIG. 1) serve to select the information which is displayed in the keyboard display section. Preferably these are illuminated push buttons which thereby indicate the instrument whose frequency is displayed. An additional push button, marked K for keyboard serves to limit the keyboard set frequency to the keyboard display, and to the keyboard memory unit, for subsequent transfer to any of the communications radios or radio navigational equipment as may be desired. Clearing of the keyboard setting and display, by operation of the "clear" button releases the push buttons for the transponder and the DME, thus freeing the keyboard for operation to pre-set alternate channel frequencies. Depressing the transponder button disconnects the display from the keyboard storage unit and connects the display to the transponder output information. The display can be returned to the keyboard storage unit by either depressing the (K) keyboard button immediately above the display unit or by depressing the clear button on the keyboard.

It is possible, if desired, to have the system interlocked so that transfer from the keyboard storage unit or temporary setting of one of the equipments to the keyboard storage frequency could only occur if the keyboard display were actually displaying the stored keyboard information. After the keyboard display has been cleared, operation of a selected keyboard push button, marked K in FIG. 1, of which one is associated with each of the communications, navigation, ADF, transponder and DME equipments, effects the transfer of that particular equipment's frequency tuning to the frequency recorded at that time in the keyboard memory unit. This new frequency setting will now appear in the communication, navigation or ADF display windows, and in the case of the transponder or DME the frequency setting may be displayed in the keyboard window. Thus the operator can immediately determine the frequency to which each of the several radio equipments has been previously tuned, through the memory device associated with each radio.

DETAILED DESCRIPTION

Figure 3:
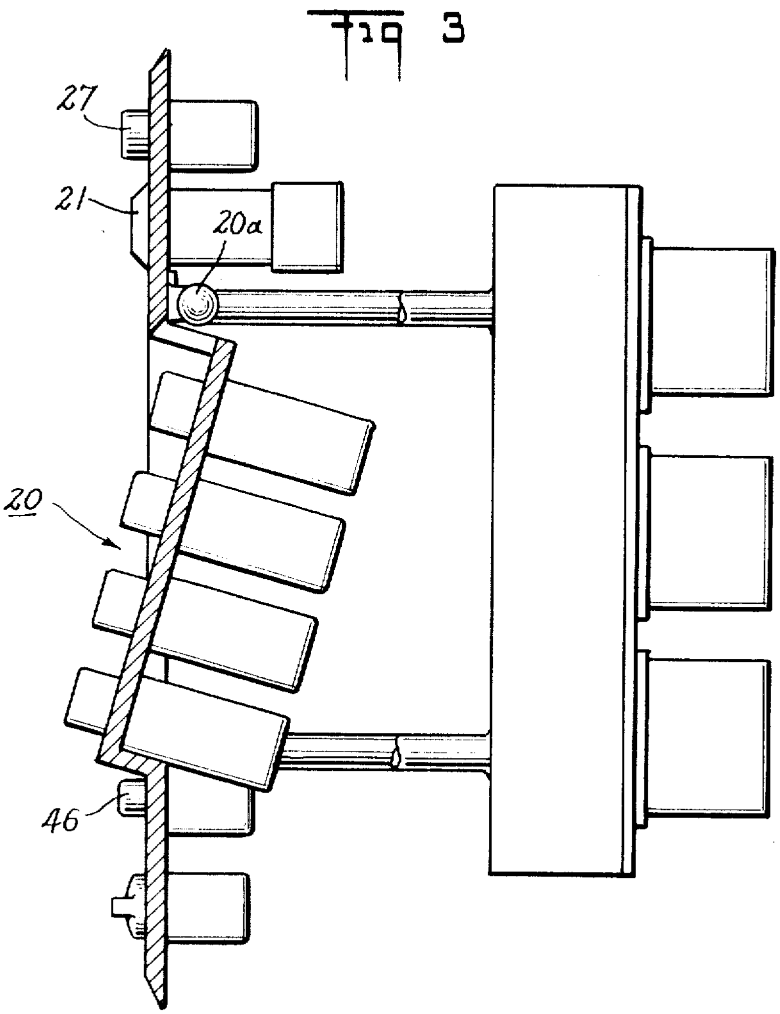
FIG. 3 is another cross-sectional view taken along the line 3—3 in FIG. 1.

Referring now in greater detail to the several FIGURES of the drawings, the operation of the invention and the preferred embodiment disclosed will be described in greater detail. The manner of operation of the central control panel illustrated in FIG. 1 of the drawings has been disclosed in the general description hereinabove. More particularly referring to FIG. 1, the control panel of the preferred embodiment includes a centrally disposed push button keyboard 20 containing numerical keys marked 1 through 9, 0 and Clear. The keyboard 20 is substantially similar to the familiar touch-tone keyboard installed on modern telephone station sets. For convenience and ease of access the plane of the keyboard 20 is preferably inclined as shown in the sectional view of FIG. 3 and is provided with panel illumination **20*a*** as also shown in FIG. 3.

Immediately above the keyboard 20 is mounted a digital display window 21 through which may be seen the numerical order of digits as punched in by manipulation of keyboard 20. Adjacent to the digital display window 21, on either side, are identical display devices 22 and 23, while in the lower left portion of the control panel is a fourth digital display device 24. These digital display readout devices are preferably illuminated and may be of the type manufactured by Tung-Sol Corp. The display window 21 serves as a common display for the keyboard setting, the distance measuring equipment frequency, and the transponder tuning. Three psuh buttons marked 25, 26 and 27 immediately above the window 21 enable the operator to select for display in window 21 the frequency to which the transponder has been tuned by pressing button 25, the frequency designation which has been punched into the keyboard by pressing button 26, or the frequency to which the DME has been tuned by pressing button 27.

When it is desired to tune the transponder, for example, to a selected frequency push button 26 is first pressed to bring up the previously entered keyboard display, the clear keyboard button is pressed to clear the display in 21, and then the desired frequency is registered in window 21 by pressing the numerical push buttons of the keyboard in that order. Then to tune the transponder to this selected frequency a transfer button 28 to the right of the numerical keyboard is pressed by the operator and the selected frequency is transferred to the tuning memory associated with the transponder. Servo means proceed automatically to tune the transponder radio to this selected frequency. The keyboard setting may now be cleared by pressing the clear button, and a different frequency may be registered for any of the other communication or navigation radio equipments. Thereafter if the operator wishes to determine what frequency the transponder has been tuned to, he merely presses button 25 whereupon the transponder's frequency is displayed in window 21. If the operator then wishes to tune the transponder to a temporary frequency, he first sets up the frequency on the keyboard 20 then presses button 29, which automatically tunes the transponder to the frequency stored in the input section, as now displayed in window 21. He may then press the transponder recall button 30 (marked R) and the previous setting stored in the transponder memory device will immediately be displayed in window 21. If the operator should then desire to retune the transponder to the new frequency setting stored in the keyboard storage section, all he need do is press the transfer button 28 and the transponder memory will accept this new information and will retune this equipment to this frequency.

The digital display window 22 is common to two separate communication transceivers marked "Comm 1" and "Comm 2." Directly above the display window 22 are four push buttons 31, 32, 33 and 34 which are respectively the transfer, display, recall, and keyboard selector switches for the Comm 1 communication channel. Immediately below window 22 are four identical push buttons 35, 36, 37 and 38 which are respectively the transfer, display, recall and keyboard selector switches for the Comm 2 transceiver channels. If the operator decides to determine to what frequency the Comm 1 transceiver has been tuned, he merely presses button 32 and the frequency setting of that equipment is displayed in window 22. Similarly he can determine the frequency to which the second communication channel, Comm 2, has been tuned by pressing button 36. Both communication transceivers, Comm 1 and Comm 2, also have solid state memory registers which contain the digital tuning information that was transferred into them when the transfer button (T) was last depressed. The function of the recall button (R) is to return tuning control of each equipment to this memory section when it has been temporarily controlled by the keyboard data storage unit by depression of the keyboard button. Either Comm 1 or Comm 2 transceivers can be tuned automatically to the frequency information stored in the keyboard memory unit by pressing either button 31 or 35. If the operator desires to tune either of these communication circuits to yet another frequency, the procedure is first to clear the keyboard by operation of the "clear button" and then to manipulate the numerical keys in sequential order corresponding to digits of the desired frequency setting. If the frequency should, for example, be 127.25 as shown for illustrative purposes in FIG. 1, the operator merely presses the numerical keyboard keys in that order and then presses button 31 to transfer that numerical registration to display window 22, whereupon the transceiver Comm 1 is automatically tuned to this frequency by the servo tuner.

The function of the four push buttons associated with each of the communication units is as follows:

The T (transfer) button 31, when depressed, clears the Comm 1 storage section of whatever frequency information appeared in there in the past and inserts the information which at the time of depressing the T button exists in the keyboard storage unit. This process does not, however, destroy the information in the keyboard storage unit. In fact, the frequency information now will appear in both storage sections.

The display buttons 32 and 36 simply provide the control of the display section 22 to display either the actual frequency to which the Comm 1 unit is set if button 32 is pressed, or to that which the Comm 2 unit is set when button 36 is pressed. The control of which transmitter is operative is also controlled by this switch when the transmitter switch is in the "auto" position.

The K (keyboard) button 34 disconnects the Comm 1 transceiver from the Comm 1 memory storage section and connects it instead to the keyboard storage section.

The recall button 33 does the reverse of the keyboard button - (reconnects Comm 1 to Comm 1's normal mode which is electrically connected to its own memory storage section).

From the above it can be seen that the frequency of the Comm 1 transceiver can be transferred from the normal frequency which appears in its own memory storage system to some new frequency to which the pilot may want to tune temporarily and which the pilot has introduced into the keyboard memory section.

Tuning of the navigation radio equipment designated "NAV 1" and "NAV 2" by selective manipulation of the push buttons 39 through 42 which are associated with NAV 1, transfer, display, recall and keyboard, whereupon the frequency to which NAV 1 is or has been tuned will be displayed in window 24; or by pressing push button 43 through 46 which are associated with the NAV 2 equipment, in which case the frequency to which NAV 2 has been tuned will be displayed in window 24.

Referring now to the righthand portion of FIG. 1 in the upper righthand corner is the automatic direction finding (ADF) display including digital display window 23 on which appears the frequency to which the automatic direction finder has been tuned. The ADF section is also provided with a transfer button 47, a recall button 48, and a keyboard button 49, all of which function in the same manner as the corresponding buttons associated with the other navigational equipment just described. Because the ADF section also has a digital memory storage like the other radio equipments controlled by the panel of FIG. 1, the display window 23 not only may be used to display the frequency to which the ADF is currently tuned at any given time but it may also be used to recall the immediate previous frequency setting by pressing the recall button 48. If it should be desired to transfer the information in the keyboard memory to the ADF memory, button 47 is pressed, the display in window 23 is immediately changed to show the change in frequency, the frequency previously stored in the ADF memory is cleared, and the servo drive retunes the ADF equipment to this new frequency. If it is desired to tune the ADF equipment to yet a third frequency different from either of the previous frequencies stored in the memory circuits of the ADF and the keyboard, the procedure then is as follows. The keyboard 20 and its display 21 are first cleared by the operation of the clear button, then the sequential digits of the desired frequency are sequentially pressed into the numerical keyboard whereupon the selected frequency now appears in window 21. Then the ADF transfer button 47 is operated, the selected and displayed frequency from the keyboard is immediately transferred to the ADF display window 23 and the servomechanism proceeds to retune the ADF to this new frequency. With reference to the distance measuring equipment (DME) control in the lower righthand portion of FIG. 1, the transfer button 51, recall button 52 and keyboard button 53 all perform the same functions as described above with reference to the ADF and also the transponder apparatus. However, the tuned frequencies and the settings recorded in the associated memory devices for the transponder and DME can only be displayed on the central display window 21 upon operation of either the transponder selector button 25 or the DME selector 27.

DESCRIPTION OF THE SYSTEM

Figure 4:
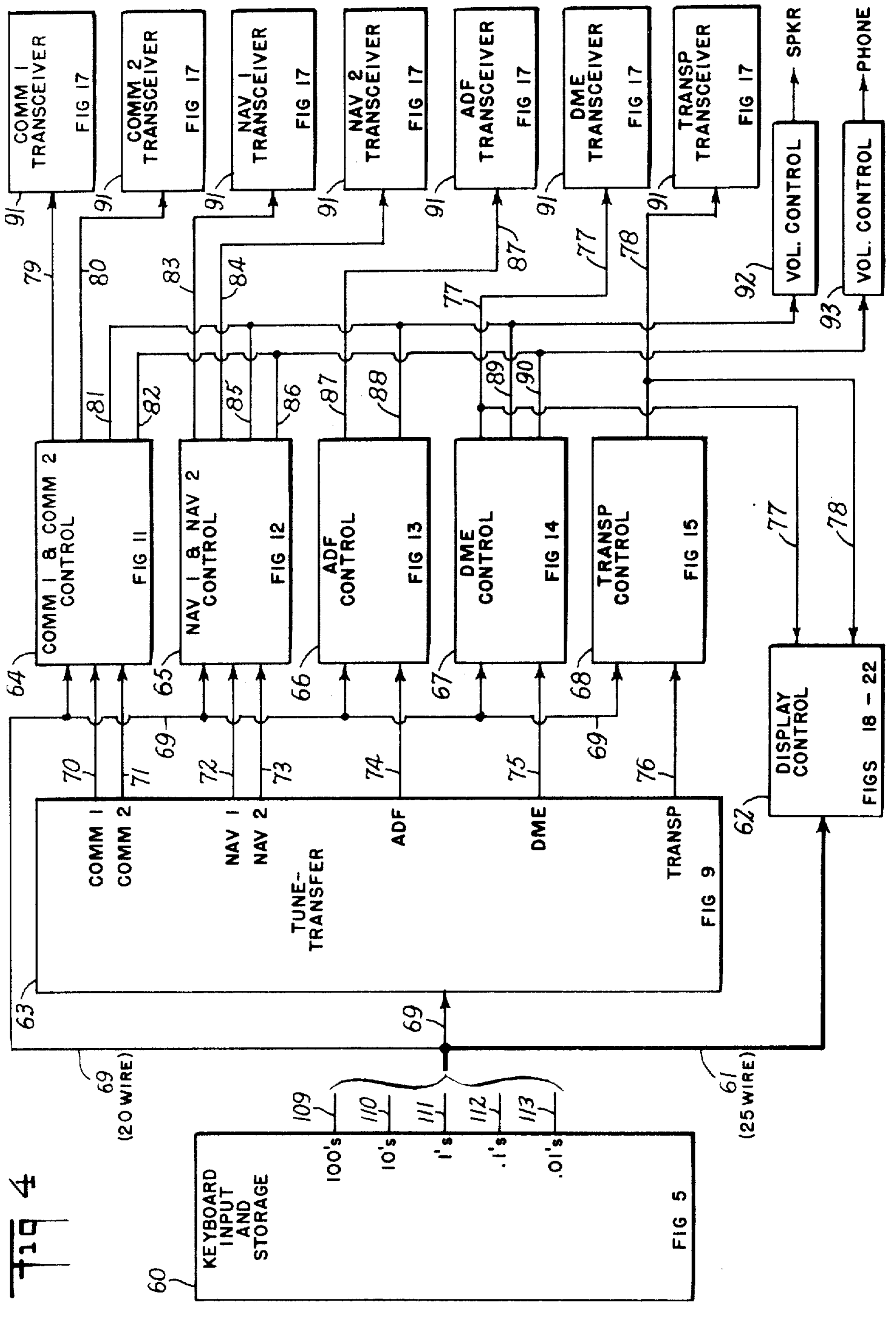
FIG. 4 is an overall block diagram of the entire control system according to the invention.

Reference is now made to FIG. 4 which is an overall block diagram of the entire control system. The input section, block 60, contains the keyboard selector and its associated memory storage unit. The keyboard generates input information in the form of two out of five binary code which is brought out of the input section via a cable 61 comprising 25 conductors, five each for the 100's, 10's, 0.1's and 0.01's digits, respectively. All 25 of these conductors are connected to the keyboard display select circuit represented by block 62. Twenty of the output conductors, five each for the 10's, 1's, 0.1's and 0.01's digits, are connected to the transfer control section 63 and to each of five equipment control sections 64 through 68 via cable 69. Twenty conductor cables 70 and 71 connect the transfer control section 63 to the equipment control section 64 for each of the communications transceivers Comm 1 and Comm 2. Similarly 20 conductor cables 72 and 73 connect the transfer control section 63 to the equipment control section 65 for each of the navigation radios NAV 1 and NAV 2. Additional 20 conductors cables 74, 75 and 76 connect from the transfer control section 63 to the equipment control section 66, 67 and 68 respectively for the ADF, DME and transponder radio equipments.

As the system provides no separate display window for either the DME or the transponder, the digital tuning data for these instruments must be displayed on the keyboard display. Accordingly the outputs of the equipment control sections 67 and 68 are connected via twenty conductor cables 77 and 78 to the display keyboard display select box 62. The output information from the communication equipment control 64 is carried over two pairs of twenty conductor cable 79 and 80, each cable being connected to a separate transceiver tuning control 91 which is a standard ARINC device such as manufactured by Collins Radio Company. Two conductor pairs 81 and 82 connect from the communications equipment control 64 to the volume controls 92 and 93 respectively for the aircraft audio system. Similarly the audio circuit pairs 85 and 86 from the naviation radio control circuit 65 are also connected to the aircraft audio system 92, and 93, and audio pair 88 from the ADF equipment control circuit is connected only to the audio amplifier circuit 92 for the aircraft loudspeaker. The audio circuit pairs 89 and 90 from the dme equipment control connect respectively to the audio circuits 92 and 93 in the aircraft. Twenty conductor cables 83 and 84 for the NAV 1 and NAV 2 receivers respectively are connected each to a separate tuning control such as 91. The twenty conductor cable 87 connects from the ADF equipment control to another tuning contrl such as 91 while 20 conductor cable 77 for the DME equipment control connects to a similar tuning control 91 as does another 20 conductor cable 78 from the transponder equipment control. Thus it will be seen that the overall system depicted in FIG. 4 provides for automatic keyboard tuning of seven separate radio equipments each of which is tuned by a standard ARINC tuning control such as 91.

Figure 5:
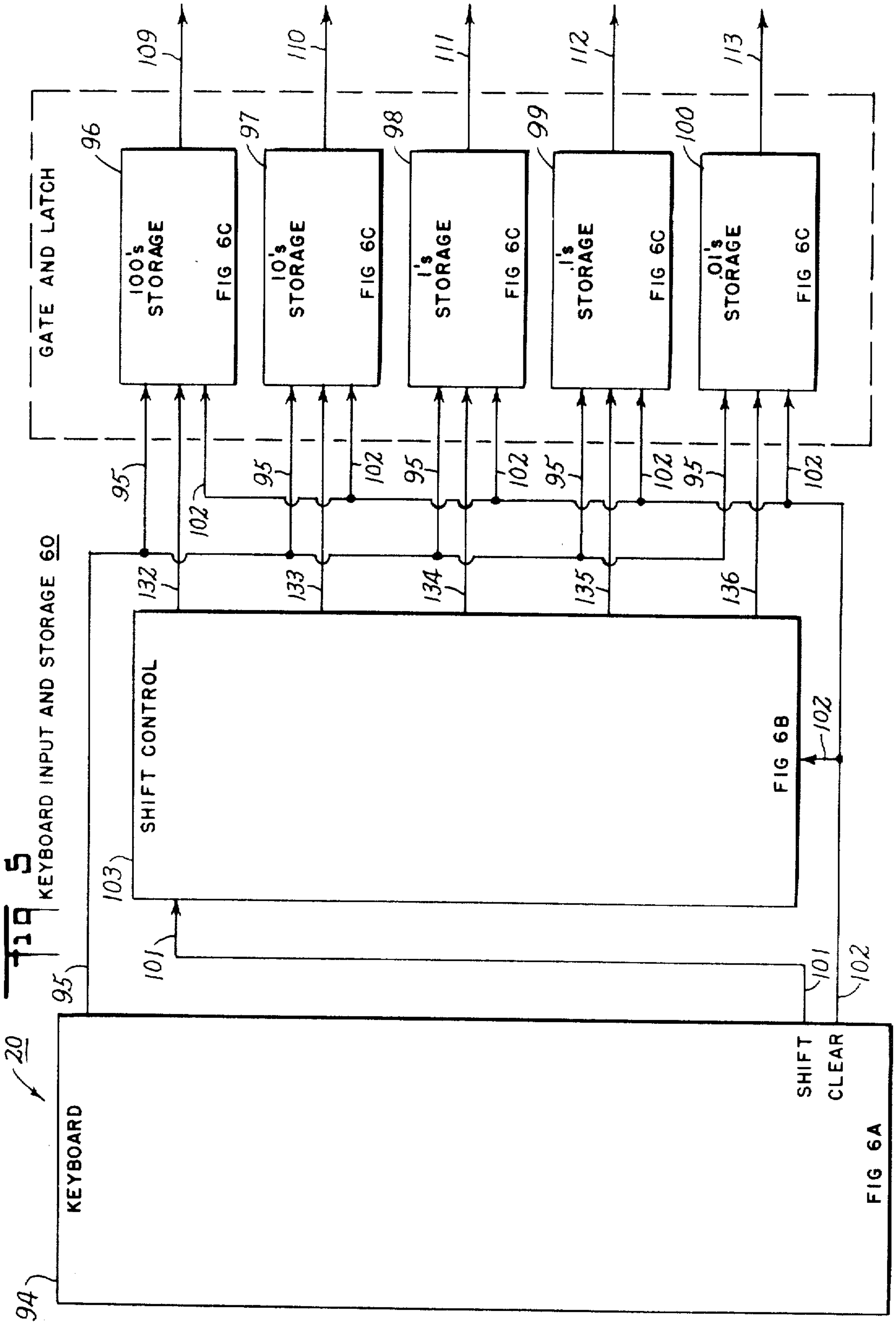
FIG. 5 is a detailed block diagram of the input section of FIG. 4.

Reference is now made to FIG. 5 which shows in more detailed block diagram form from the elements which comprise the input section 60 of FIG. 4. The numerical keyboard 94 which functions as a code converter converts decimal digit input into two out of five binary code outputs which appear on the five conductor cable 95 connecting to one input of each of five memory storage sections 96, 97, 98, 99 and 100. The keyboard 94 is also connected by conductors 101 and 102 to the shift control circuit 103. The clear circuit conductor 102 also connects the keyboard to one input of each memory storage section 96 through 100. The shift control circuit provides five outputs each over a five conductor cable 104, 105, 106, 107 and 108. The cables 104 through 108 are respectively connected to the memory storage units 96 through 100. The outputs of the memory storage units 96 through 100 are each connected via five conductor cables 109 through 113 respectively to the transfer control unit 63 of FIG. 4 and also to the equipment control circuits 64 through 68 as well as to the keyboard display circuit 62.

Figure 6A:
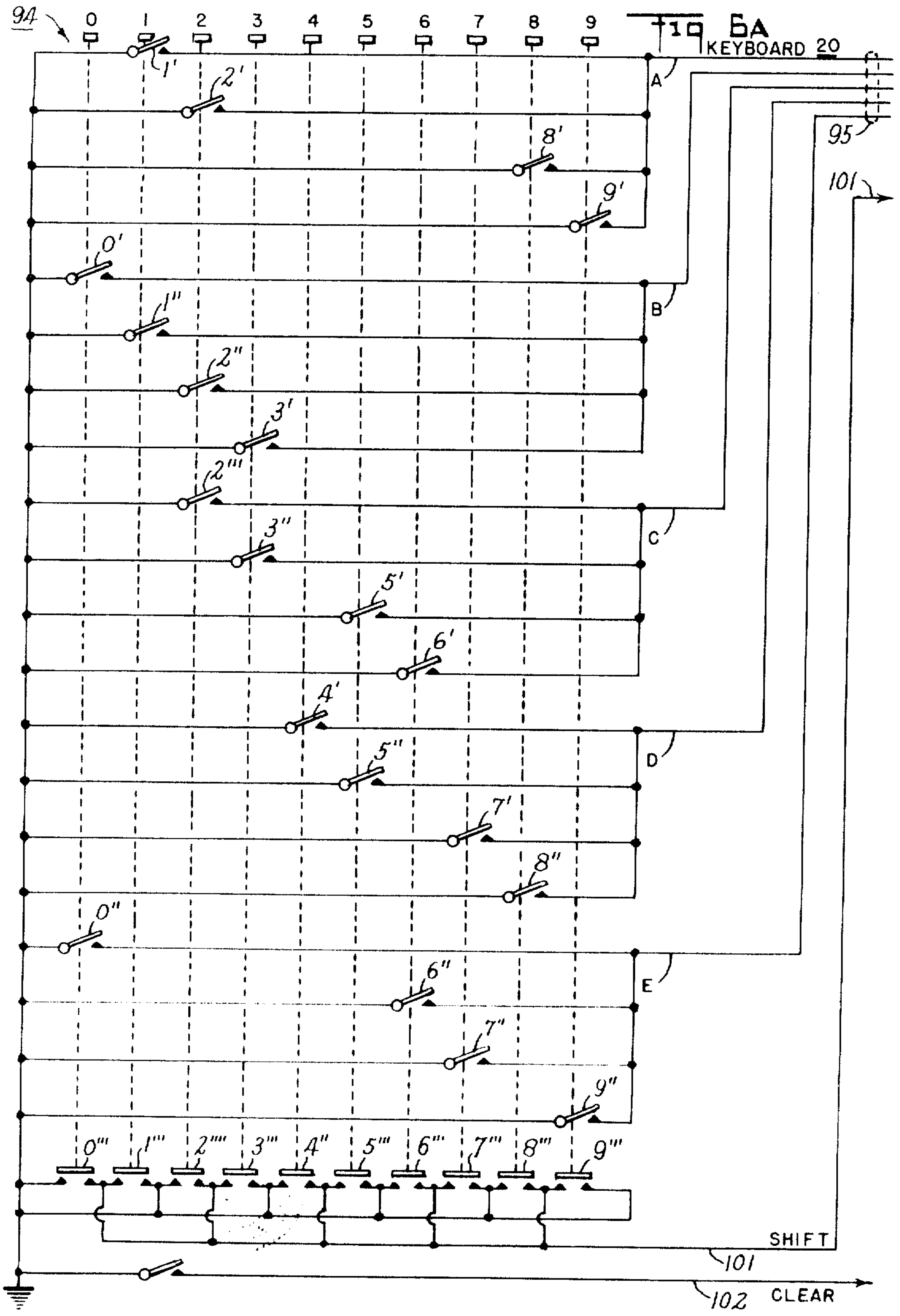
FIG. 6A is a schematic diagram of the keyboard section of the control panel.

The keyboard schematic shown in FIG. 6A comprises a total of ten three pole single throw spring loaded push button switches which may be of the type manufactured by Electromechanical Components, Inc. An additional single contact single throw push button serves to clear to the keyboard. When the 0 push button is depressed it closes switch contacts 0′, 0″ and 0‴ thereby connecting ground to lines B and E and also to the shift line 101. When push button 1 is depressed it closes switch contacts 1′, 1″ and 1‴ thereby grounding lines A, B and shift line 101. Push button 2 connects ground to lines A, B and C as well as the shift line 101, and push button 3 grounds lines B and C as well as the shift line 101. Push button 4 applies ground only to line D and the shift line 101 while push button 5 grounds lines C and D, as well as shift line 101, push button 6 grounds lines C and E, push button 7 grounds lines D and E, push button 8 grounds lines A and D while push button 9 connects ground to lines A and E. In this manner manipulation of the keyboard accomplishes code conversion from decimal numerics into a two out of five binary code.

Figure 6B:
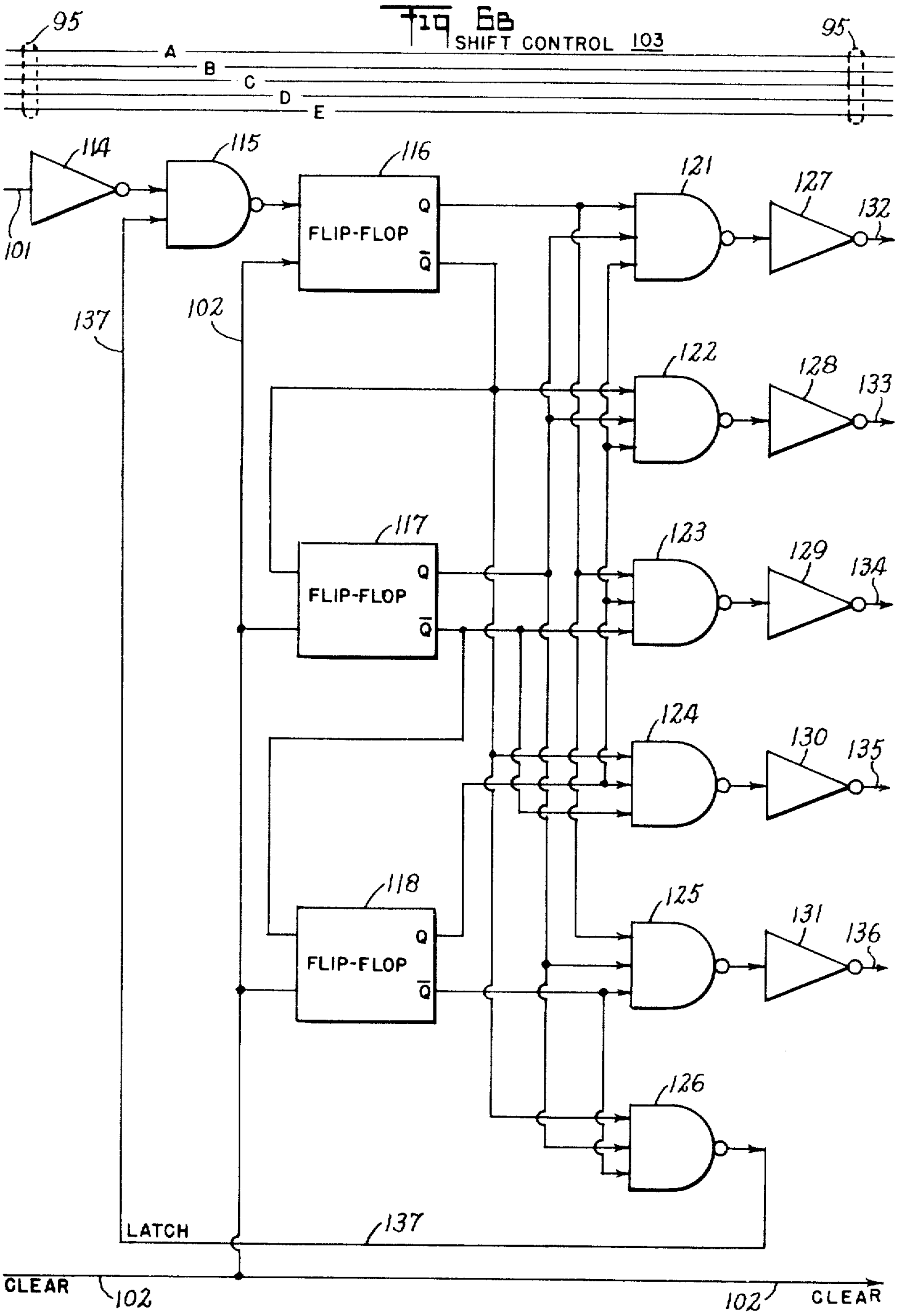
FIG. 6B is a schematic diagram of the shift control portion of the invention.
Figures 6C, 7, 8:
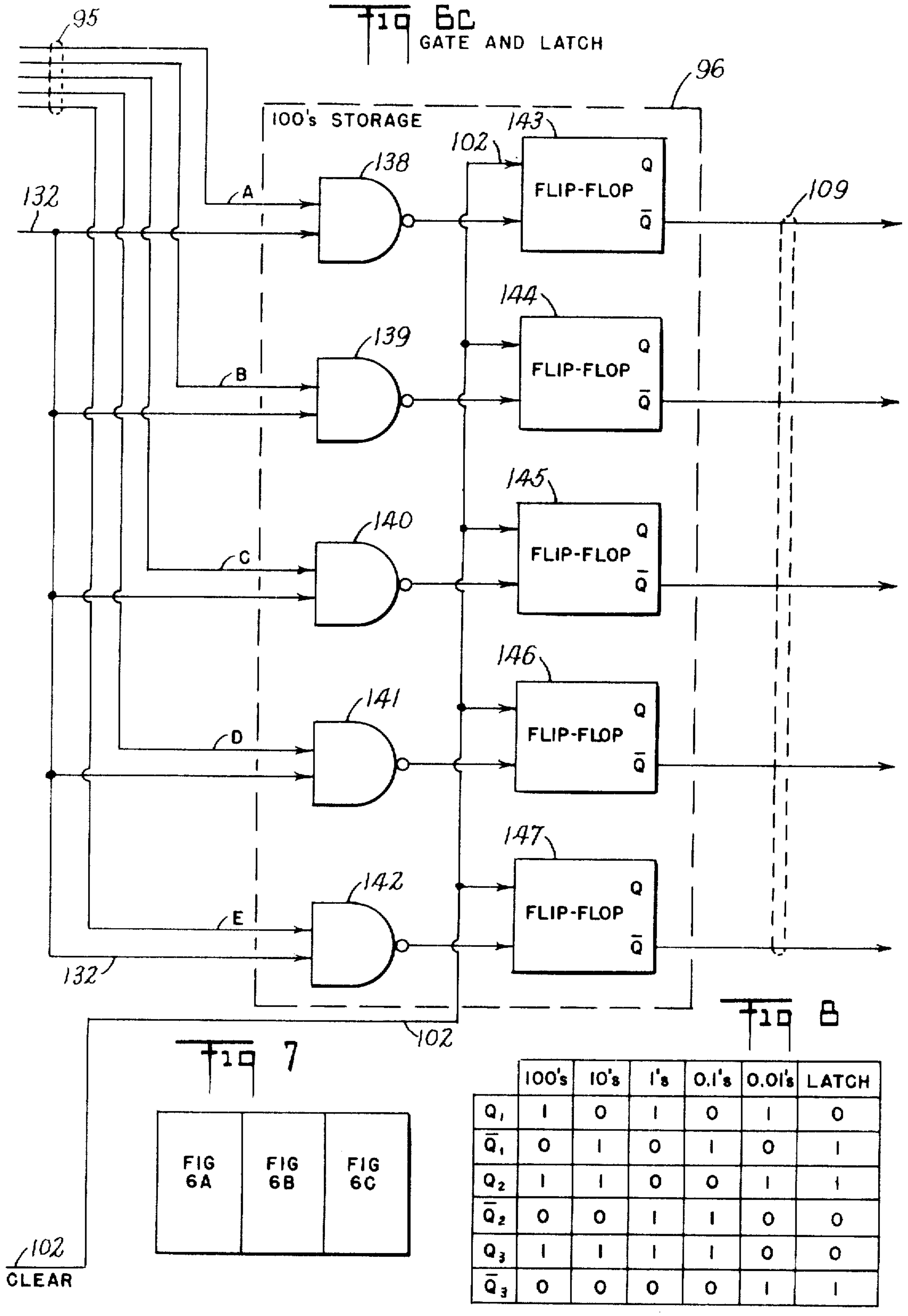

Reference will now be made to FIG. 6B which is a schematic diagram of the Shift Control Circuit 103 as shown in FIG. 5. The purpose of the Shift Control Section of FIG. 5 is to provide control of a set of storage elements so that serial input information may be stored in parallel order. The shift control conductor 101 from FIG. 6A connects to an inverter 114. The clear conductor 102 from FIG. 6A connects to the inputs of three flip-flops 116, 117 and 118. The output of inverter 114 is connected to one input of a negative AND gate 115 while the other input of NAND gate 115 is connected to the output of a negative AND gate 126 to perform a latching function as shown in FIG. 6B. The three flip-flop elements 116, 117 and 118 are preset by means of the clear line (clear occurring when the clear line is in the 0 state) such that the flip-flop outputs are Q in the 1 state and $\bar{Q}$ in the 0 state. The system of FIG. 6B is designed so that the "shift" input signal which is normally in the 0 state will cause no change when transferred to the 1 state but will shift the output when it returns to the 0 state. In order that the system will lock out after five input digits have been introduced, a latch gate 126 is provided. The input shift signal on line 101 goes through inverter 114 so that when the shift signal is in 1 state, the inverter output drops to the 0 state causing the latch gate 126 output to go to the 1 state. When the shift input returns to the 0 state, the inverter 114 output returns to a 1 and the latch gate 126 output returns to 0 provided the latch input to this gate is in the 1 state. A Truth Table 130, FIG. 8, shows the conditions existing following each shift input signal. It can be seen that the output from the shift control section will provide a 1 output on only one of the output lines at any given time and that 1 will shift from the 100th's to the 10th's, etc., until all five of the output lines 132, 133, 134, 135 and 136 are in the 0 state and the latch line 137 has transferred from the normal 1 state to the 0 state. The inverters 127 through 131 merely reverse the polarity of the outputs on lines 132 through 136 which represent respectively the 100's, 10's, 1's,0.1's and 0.01's digits. The output lines 132 through 136 connect to the input of the gate and latch section which is the memory storage system disclosed in greater detail in FIG. 6C.

FIG. 6C discloses in greater detail the circuitry of each of the memory storage devices 96, 97, 98, 99 and 100 as appear in FIG. 5. The output lines 132 through 136 from FIG. 6B are each connected to one input of NAND gates 138 through 142 as shown in FIG. 6C. The other input terminal of each NAND gate 138 through 142 is connected to one of the five lines in cable 95 from the shift control circuit of FIG. 5. The outputs of the negative AND gates 138 through 142 are each connected to one input of flip-flops 143 through 147. The other input of these flip-flops 143 through 147 is connected to the clear line 102 in FIG. 6C. Thus it will be seen that the gate and latch section comprises five dual input gates followed by five flip-flop storage elements. The gates are negative AND gates (NAND). Both inputs to each gate must be in the 1 state in order for the output of that gate to be in the 0 state. The normal operation of this circuit is such that any two of the five input lines 132 through 136 would be in the 1 state depending upon the decimal number selected by the operator. The other input is common to all gates and is normally in the 0 state and is raised to 1 state by either a manual switch or by some other logic element depending upon its particular use in the system. The flip-flops 143 through 147 are preset by means of an 0 input applied to the clear line such that the Q output is in the 1 state and, therefore, $\bar{Q}$ is in the 0 state. With each of the flip-flops 143 through 147 in an input transition from the 1 to the 0 state will change the output conditions to where Q is in its 0 state and $\bar{Q}$ in the 1 state. A transition from 0 to 1 will cause no change in the flip-flop output.

Figure 9A:
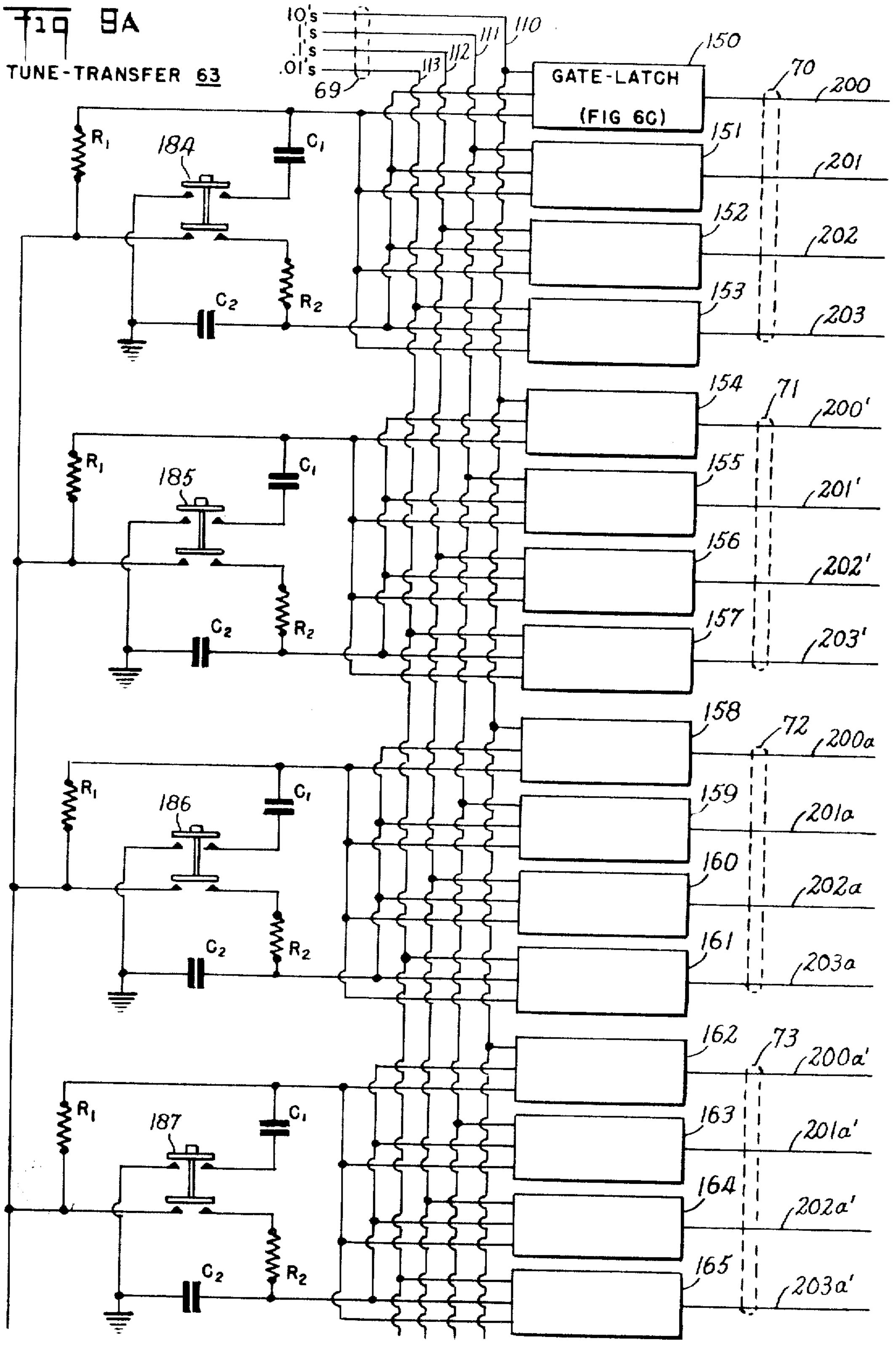
FIGS. 9A and 9B when connected together in the manner shown by FIG. 10 form a schematic diagram of the tune transfer control circuits showing the manner in which a plurality of gate and latch sections as illustrated in FIG. 6C are interconnected.
Figure 9B:
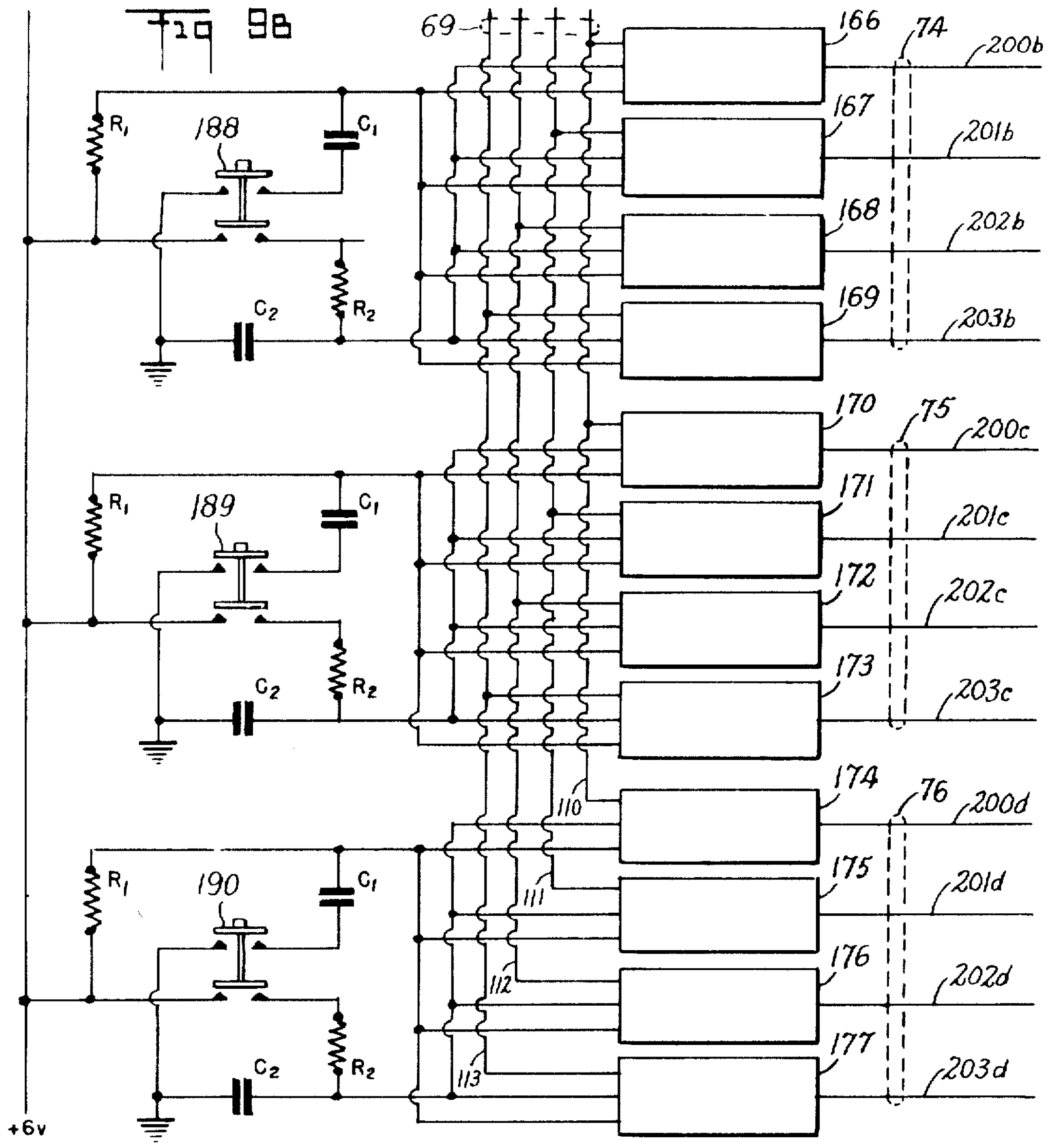
Figure 10:
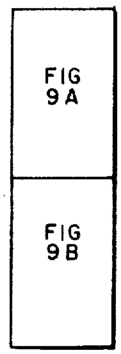
Figures 17, 18:
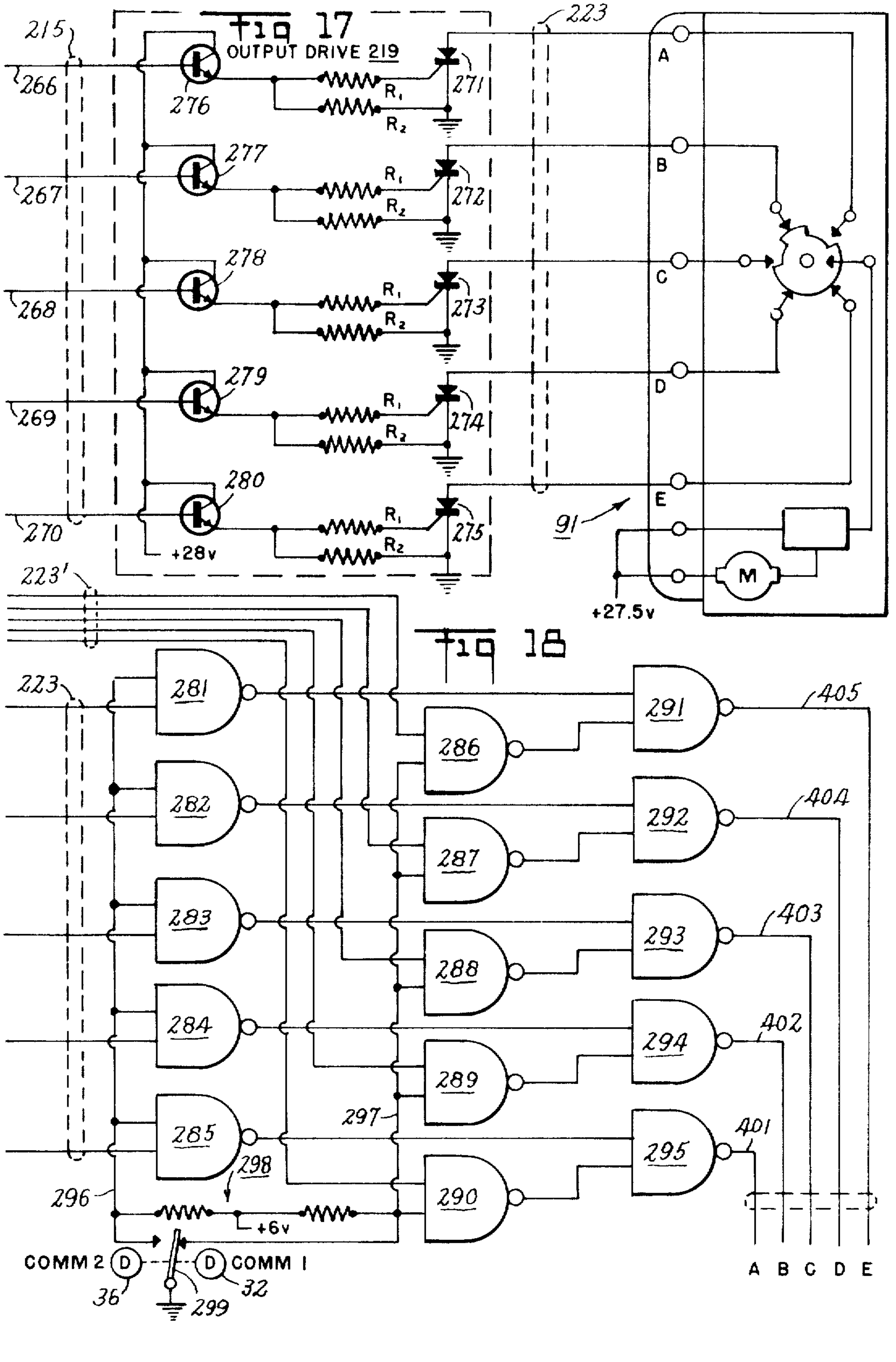
FIG. 17 is another detailed schematic diagram of a portion of the circuits of FIGS. 11–15 showing the interconnection of transistors and diodes in the output drive sections of FIGS. 11–15.
FIG. 18 is another detailed schematic diagram showing the gating circuitry for the display control sections of FIGS. 11–13.

Reference is now made to the Tune-Transfer Section as shown in FIGS. 9A and 9B of the drawings. The purpose of this section of the system is to provide means by which information may be transferred into and stored in any of the seven output sections, Comm 1, Comm 2, NAV 1, NAV 2, ADF, DME or TRANS. Each of the input lines 110 through 113 comprises a five conductor cable which provides a two out of five binary code for a decimal number as generated by the keyboard circuit of FIG. 6A. Transfer and storage capabilities are provided by the system shown in FIGS. 9A and 9B. Operation of any one of the transfer (T) switches 184–190 causes the voltage at the clear line to drop immediately to "0" (0 state) through the differentiating capacity of $R_1C_1$. This removes any previously stored information and sets all flip-flops (such as 143–147 in FIG. 6C) to their original state as described hereinabove with reference to the Gate and Latch Section of FIG. 6C. Through the other contact of each transfer (T) switch, 184–190, a delayed positive voltage is applied to the gate line through the delay circuits of $R_2C_2$. These RC delay circuits provide approximately 2 milliseconds delay thereby allowing a sufficient time for the Clear operation to be completed. Each gate 150 through 177 will then go to the 1 state thereby allowing the information appearing on the input lines 180 through 183 to be transferred to the storage flip-flops as described above with reference to FIG. 6C. Transfer of the input information can be made to any or all of the output systems through operation of the appropriate transfer switches. Each of the output blocks 150 through 177 comprises a gate and latch section as shown in FIG. 6C. It is possible to use the output from this transfer control section to operate lower power servo tuning or drive systems directly. However as shown in FIG. 17 of the drawings these outputs are connected through an amplifying solid state switching circuit, using SCR's for increased current capacity, which is capable of controlling higher powered devices such as the motor driven transceiver tuning device also shown in FIG. 17.

Figure 11:
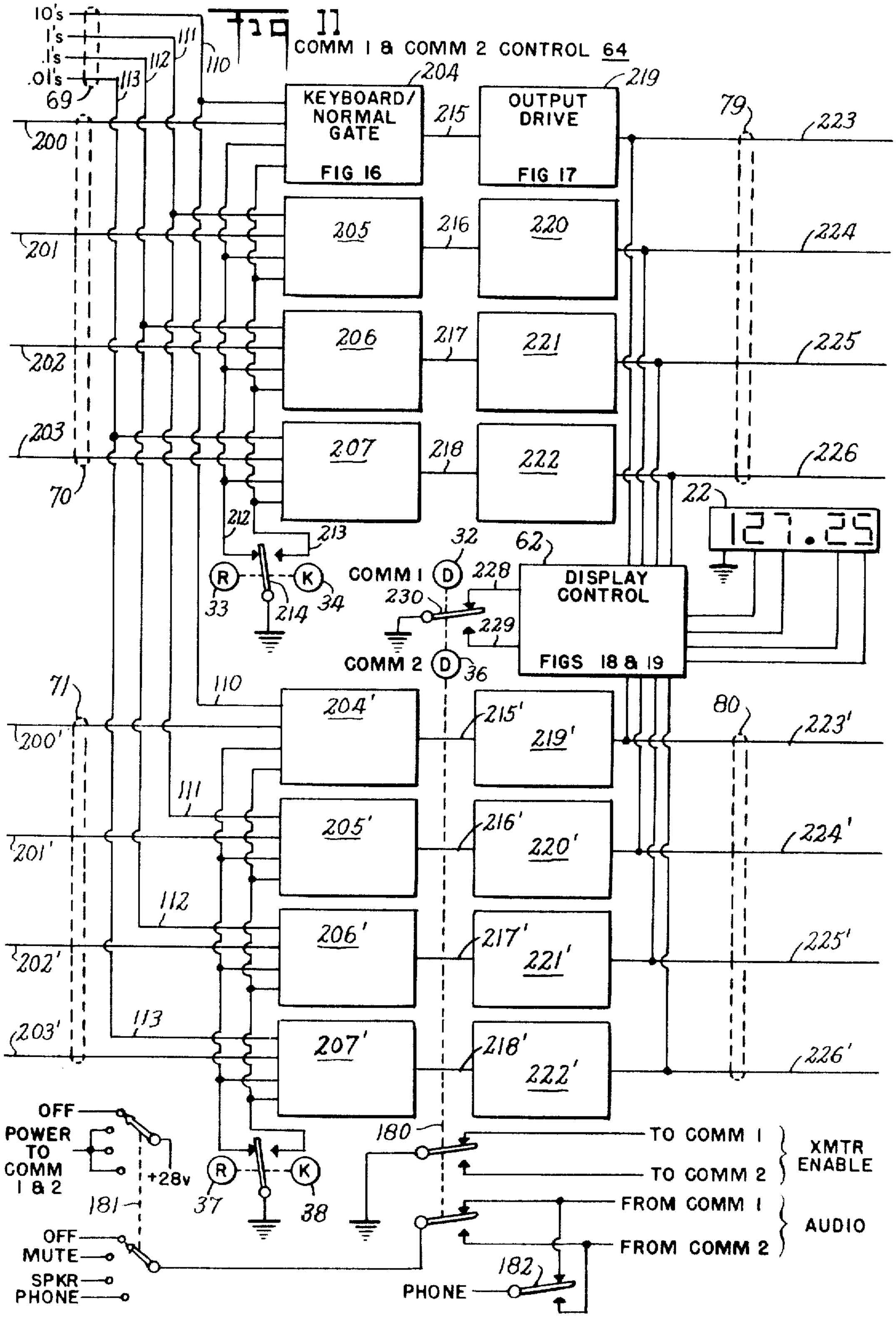
FIG. 11 is an overall schematic diagram of a communication equipment control section.

Reference is now made to FIG. 11 of the drawings which is a schematic diagram of the Equipment Control Section for the Comm 1 and Comm 2 transceivers indicated generally at 64 in FIG. 4 and FIG. 11. The function of this section is to provide amplification of the low power input control signals from the digital keyboard, provide capability for switching to either of two input control systems over multiconductor cables 70 and 71 by operation of ganged switch 180, and to provide a numerical display 22 showing the condition of the output lines 79 or 80. In addition to these control elements, appropriate audio controls such as volume control, mute/speaker/phone switch, etc., are also provided by switches 181 and 182 in this section for each of the communication transceivers and for certain of the navagational aids equipment such as, for example, the NAV 1 and NAV 2 receivers, the ADF receiver and the DME receiver. Four cables of five conductors each, 200, 201, 202 and 203 comprise the twenty conductor cable identified by reference number 70 in FIG. 4 and connect the output of the transfer control circuit to one input of each of the keyboard/normal gates, 204, 205, 206 and 207. The deails of these gates 204 through 207 will be described hereinafter with reference to FIG. 16 of the drawings.

The other cable group 69 in FIG. 11 comprising four conductors each, 110, 111, 112, and 113 which together comprise the twenty conductor cable identified by reference 69 in FIG. 4, connects the keyboard control section to another input of each of the gates 204 through 207. Thus, the five conductors of 110 are connected to inputs of gate 204, 111 connects to the input of 204, 112 connects to the input of 206 and 213 connects to the input of 207. Two other input conductors 212 and 213 both of which connect to inputs of all four gates 204 through 207 are respectively connected to a single pole double throw switch 214 which enables the operator to manually select either the information recorded in the keyboard storage or to recall the information recorded in the communication equipment storage. Output signals from gates 204 through 207 are carried by five conductor cables 215, 216, 217, and 218 respectively. These output signals are connected into the inputs of four separate output drive circuits 219, 220, 221 and 222 which will be described in greater detail hereinafter with reference to FIG. 17 of the drawings.

The outputs of each of the drive circuits 219 through 222 in FIG. 11 are carried over five conductor cables 222, 223, 224, 225 and 226 respectively, in cable group 79 (FIG. 4 and FIG. 11), and are connected to the display control section 62 which will be described in greater detail hereinafter with reference to FIGS. 18 and 19 of the drawings. The output drive lines 223 through 226 also connect to the ARINC transceiver tuning control device shown in FIG. 17. Also connected to the display control section 62 are two more input lines 228 and 229 each of which is connected through single pole double throw switch 230 (ganged with DPDT switch 180) to ground, whereby the operator may manually switch the display from Comm 1 to Comm 2.

The Comm 2 equipment control circuit shown in the lower half of FIG. 11 is identical to the Comm 1 transceiver control circuit just described with reference to the upper half of FIG. 11. The keyboard input lines 109 through 113 are common to both Comm 1 and Comm 2. The cable group 71 comprising four cables of five conductors each, 200', 201', 202' and 203' connects the output of the transfer and control section (FIG. 9) to one input each of the keyboard/normal gates 204', 205', 206' and 207', each of which is shown in greater detail by FIG. 16. Similarly the output signals on the conductors of cable group 80 are applied to the output drive section 91 (FIG. 4). Only one display control section 62 (FIGS. 18 and 19) is required for both Comm 1 and Comm 2 because only one transceiver frequency is displayed at a time. The upper section of switch 180 (FIG. 11) selects whether the transmitter of Comm 1 or Comm 2 is to be used. In this way are display window 22 (FIG. 1) always presents the frequency of the communication transceiver whose transmitter has been "enabled."

The switch 230 in FIG. 11 is operated by manually depressing either of the display buttons 32 or 36 (FIG. 1) to selectively display the frequency tuning of either Comm 1 or Comm 2 transceivers. The visual display indicated generally at 22 in FIG. 11 comprises five substantially identical seven element illuminated display devices, one of which is shown in detail in FIG. 20 which will be described hereinafter. As the first of these display windows 22, displaying the numeral 1 in FIG. 11, is never called upon to display anything other than the number 1 in this aircraft communications control system, this indicator is permanently wired and merely turns on and off whether a 1 is to be displayed or not. It is for this reason that the visual display can be accomplished by means of only four cables of five conductors each in cable group 69 instead of requiring the use of all 25 conductors coming from the keyboard memory unit 60 in FIG. 4 and identified by the cable reference 61.

Figure 12:
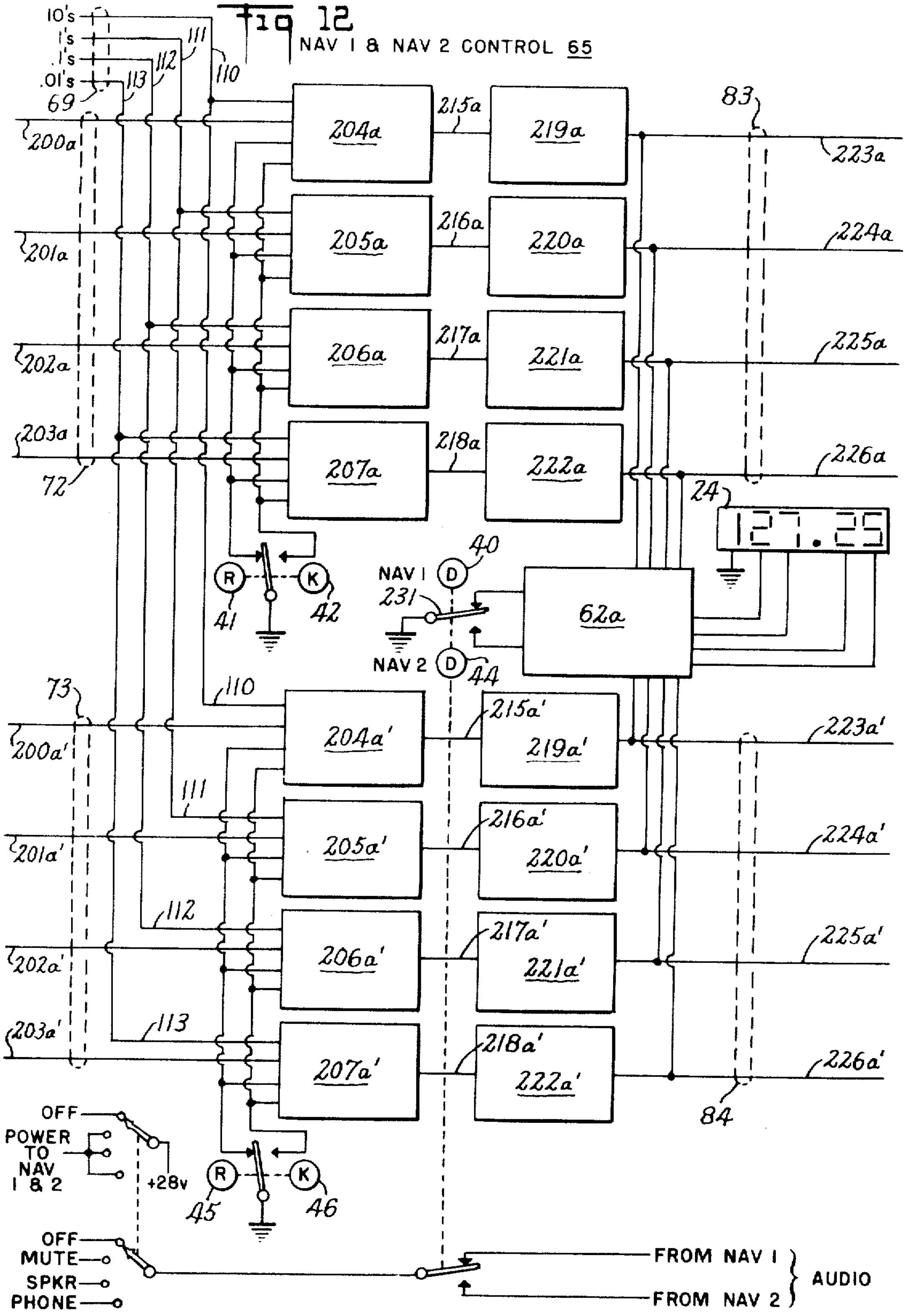
FIG. 12 is an overall schematic diagram of a navigation equipment control section.

Referring now to FIG. 12 of the drawings which is a schematic diagram of the Equipment Control Section for the NAV 1 and NAV 2 receivers, indicated generally at 65 in FIG. 4 and FIG. 12, it will be seen that this section represents a substantial duplicate of the Comm 1 and Comm 2 control circuit described hereinabove with reference to FIG. 11. Conductor cables 110, 111, 112 and 113 are common to FIG. 11 and FIG. 12 and serve to connect the inputs of gates **204*a*–207*a* and 204*a*'–207*a*' to the outputs of the transfer control circuits 158–165 in FIG. 9A. One display and control section 62*a* (FIGS. 18 and 19) serves both NAV 1 and NAV 2 receivers as the setting of only one such receiver can be displayed at a time in display window 24. The display buttons 40 and 41 (FIG. 12 and FIG. 1) operate switch 231 to selectively display the frequency setting of either the NAV 1 or NAV 2 receivers in the display window 24 (FIG. 12 and FIG. 1**).

Figure 13:
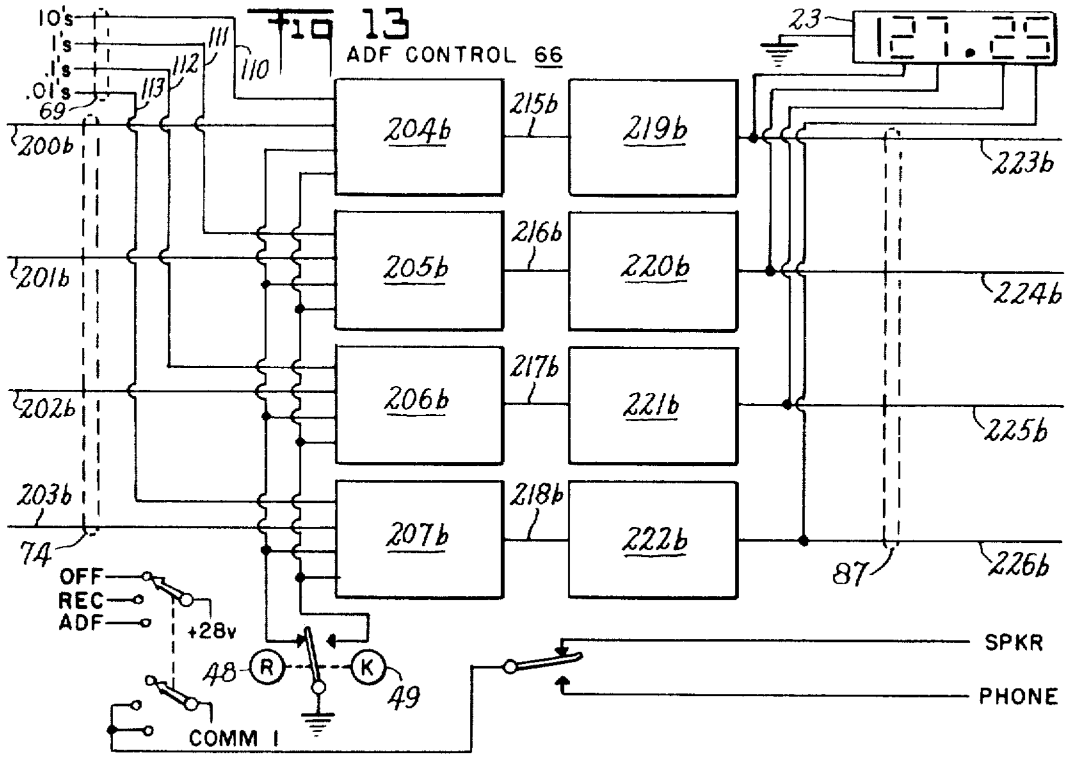
FIG. 13 is a schematic diagram of an Automatic Direction Finding equipment control section.

Reference is now made to FIG. 13 which is the ADF equipment control section, generally indicated at 66 in FIG. 4. Again the keyboard connecting cables 110–113 in cable group 69 comprise the same conductors described above with reference to FIG. 11 and FIG. 12. The gates **204*b* through 207*b* are identical with gates 204*a*–207*a* described above and as disclosed in FIG. 16. The output drive sections 219*b* through 222*b* are identical with 219*a*–222*a* described above, and the digital display window 23 is that shown in FIG. 1 for displaying the ADF frequency. The recall button 48 and the keyboard button 49 serve to either recall the digital data previously stored in the ADF memory 166–169 (FIG. 9B) or to connect the gates 204*b*–207*b*** to the keyboard control whereby a new frequency setting may be punched in.

Figure 14:
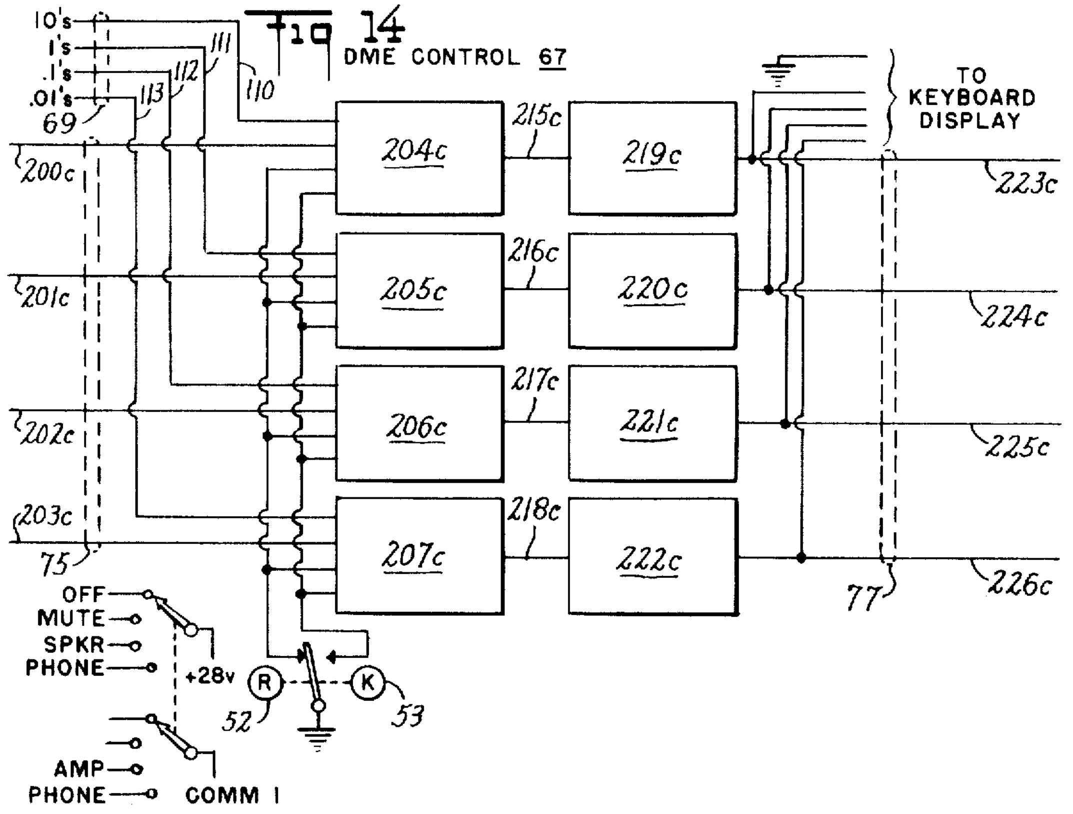
FIG. 14 is a schematic diagram of a Distance Measuring Equipment control section.

FIG. 14 discloses the DME equipment control section, indicated generally at 67 in FIG. 1, and is identical in all respects with FIG. 13 except that there is no separate display window for the DME. Accordingly the outputs of the output drive sections **219*c*–222*c* are connected through the keyboard display select section (FIG. 18 and FIG. 19) 170–173 to the keyboard display window 21 (FIG. 1) by operation of the select button 27 (FIG. 1). To recall a previous frequency setting the recall button 52 is operated, or by operating keyboard button 53 a new frequency setting for the DME may be selected by manipulation of the keyboard 20 (FIG. 1). The DME frequency setting can only be displayed in the keyboard display window 21 (FIG. 1**).

Figures 15, 16:
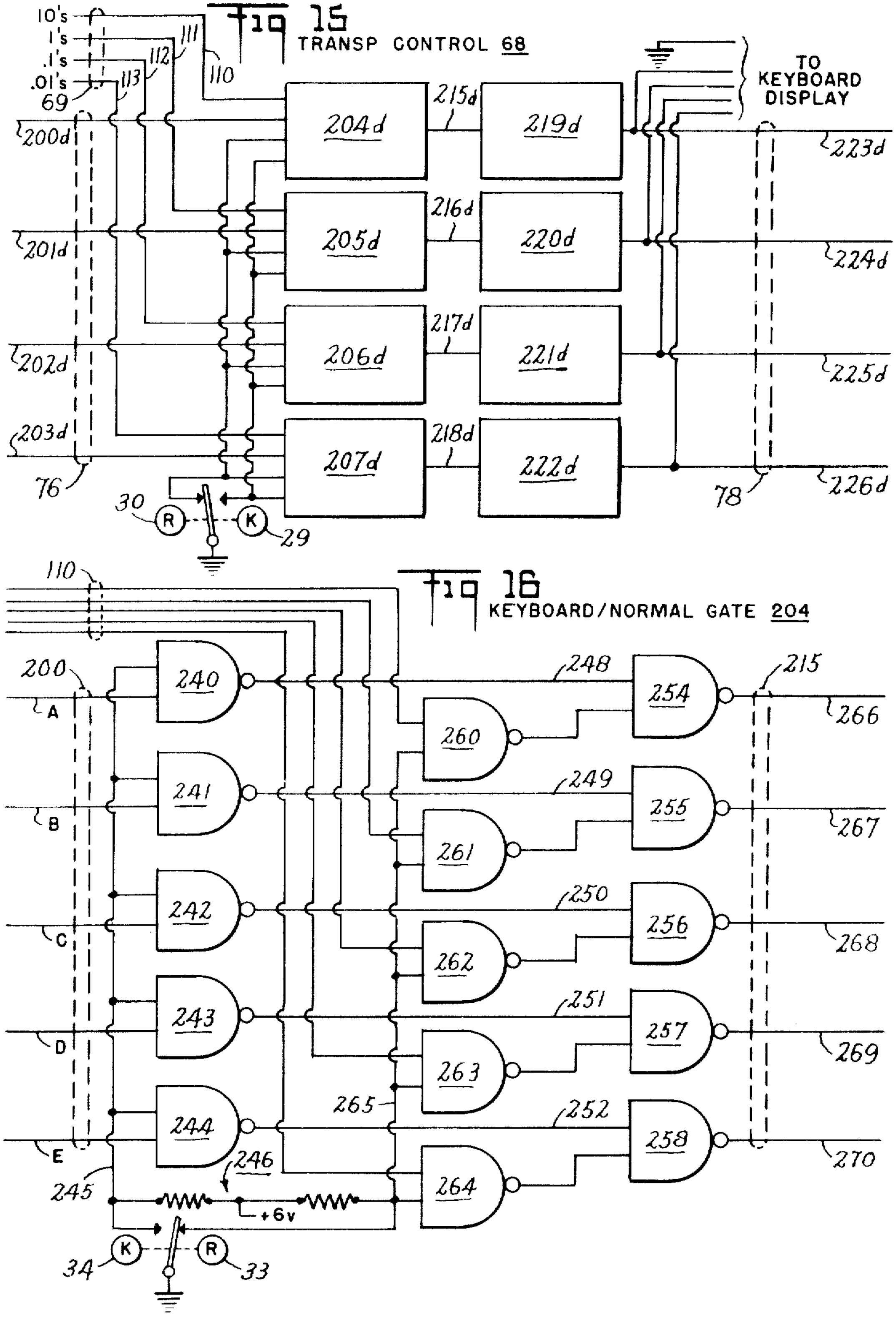
FIG. 15 is a schematic diagram of a Transponder equipment control section.
FIG. 16 is a detailed schematic diagram of a portion of the circuits shown in FIGS. 11–15 showing the interconnections of NAND/NOR gates in the normal keyboard control.

FIG. 15 which discloses the Transponder equipment control circuit indicated generally at 68 in FIG. 4 is identical in all respects to the circuit of FIG. 14. First input gate signals from the keyboard and storage section (FIG. 5) are applied to gates **204*d*–207*d* over multiconductor cables 110, 111, 112 and 113 of cable group 69. Second input gate signals are applied to gates 204*d*–207*d* over the conductors of cable group 76 from the transfer and control circuits of FIG. 9. Output drive and display signals are applied to the Transponder tuning drive mechanism, and to the keyboard display section, over lines 223*d*–226*d* in the same manner as in FIG. 14. When the Transponder recall (R) button 30 is closed, as shown in FIG. 15, the digital data previously stored in the gate and latch sections 174–177 of FIG. 9B is connected to the equipment drive and keyboard display. When the Transponder keyboard (K) button 29 is closed the Transponder is connected to the keyboard memory and new digital data may be recorded and stored in sections 204*d*–207*d* by manipulation of the numerical keyboard and operation of the transfer (T) button 28 (FIG. 1**).

Reference is now made to FIG. 16 of the drawings which shows the circuit diagram for the keyboard/normal gate elements 204 through 207 in FIG. 11. The function of each gate is to provide the ability for switching the output to either of two input control systems. This is accomplished through the use of five dual input gates for each of the input sections with one input of each gate going to the appropriate line A through E of its associated input, and the other input of each of five gates going to a common line which provides for normal operation, a (1) input to the set of normal input gates and an (0) input to the set of external input gates as selected by the normal-manual switch. Thus the fives lines A, B, C, D, and E appearing at the left in FIG. 16 may be any of the five line cables coming from the gate latch section of FIG. 5 as appearing in the Tune Transfer Section of FIGS. 9A and 9B. For example, these five lines in FIG. 16 may be the five conductor cable shown coming from the latching gate identified by reference 150 in FIG. 9A; as shown A is connected to one input of NAND gate 240, B similarly connects to NAND gate 241, C similarly connects to NAND gate 242, D connects with the input of NAND gate 243 and E is connected to the input of NAND gate 244. The other input terminals of each of the NAND gates 240 through 244 are all connected via line 245 to voltage divider 246 and to a single pole double throw manual-normal switch 247. As shown in FIG. 16 switch 247 is in its normal, or recall position.

Still referring to FIG. 16, the outputs of NAND gates 240 through 244 are connected via lines 248, 249, 250 and 251 and 252 to further NAND gates 254, 255, 256, 257 and 258 respectively. A third set of NAND gates 260 through 264 have their outputs connected to the other input of NAND gates 254 through 258 respectively, as shown in FIG. 16, while one input of each of the NAND gates 260 through 264 is connected with one of the lines 109 through 113 coming from the keyboard memory section. The other input of each of the NAND gates 260 to 264 is connected via line 265 to current limiting resistors 246 and single pole double throw switch 247. The five output lines 266 through 270 of FIG. 16 are connected to the input of the drive section shown in FIG. 17 which will be described hereinafter. Each of the gates shown in FIG. 16 are such that both of their inputs must be in their 1 state in order that an 0 output be obtained. Each of the output gates 254 through 258 is such that it will provide a 1 output when either of its inputs is in its 0 state. It can be seen, therefore, that only the 1 inputs appearing in the set of input lines selected by the normal manual gate will provide 1 outputs at the same output lines. Suitable components for the gating devices shown in FIG. 16 are manufactured, for example, by Motorola and sold under their designation MC946.

Reference is now made to FIG. 17 which illustrates the output drive section of the system. This circuit comprises five solid state silicon controlled rectifiers (SCR), 271 through 275 functioning as an output switch for each line (266–270) of the output circuit. Thus each silicon rectifier 271–275 is dirven from a transistor amplifier emitter follower stage 276–280 which provides power gain so that normal logic elements of low power 254–258 in FIG. 16) can be used for the input. The output signals coming from FIG. 16 appear on conductors 266 through 270 and are amplified by transistors 276 through 280 respectively, which in turn control a greater amount of current flow through SCR's 271–275. The use of emitter follower transistor stages 276–280 may not be essential in view of the rapid advances presently being made in the development of solid state switching devices. Thus it is anticipated that higher current carrying logic elements may be available by the time that this patent application becomes published. In that event the output circuit lines 266–270 may be connected directly to the SCR switches 271–275. The output currents from the drive circuit appearing on lines A, B, C, D, E, which represent a two out of five code, are connected directly to the standard ARINC tuning control which tunes the radio equipment. The information on output lines A through E is also connected to the visual display through a display control gating circuit shown in FIG. 18. A separate keyboard/normal control section such as shown in FIG. 16, and a separate output drive section as shown in FIG. 17 is provided for each of the radio communication equipments employed in the system. Thus in the system disclosed specifically herein, seven such combinations are employed, as are seven different radio equipments.

The display control gating circuit of FIG. 18 is identical to the normal-manual gate circuit of FIG. 16, and functions in the same manner as the circuit of FIG. 16 to provide the ability to switch the output to either of two input control systems. This is accomplished through the use of five dual input gates 281 through 285 for the Comm 1 input section and 286 through 290 for the Comm 2 input section, with one input of each gate going to the appropriate line A through E of its associated input section, and the other input line of gates 281 through 285 going to common line 296 and positive potential through voltage divider 298, while the other input of gates 286 through 290 connect to common line 297 and to positive potential through voltage divider 298 which provides for normal operation, with switch 299 in the position shown in FIG. 18, a 1 input to the set of normal input gates 281–285 and a 0 input to the set of external input gates 286–290 as selected by the Comm 2 - Comm 1 switch. As in FIG. 16, each of the gates 291 through 295 in FIG. 18 require both inputs to be in the 1 state in order that a 0 output be obtained. The two out of five output gates 291–295 which are in this condition pass an output signal over the corresponding output lines 401–405.

Figure 19:
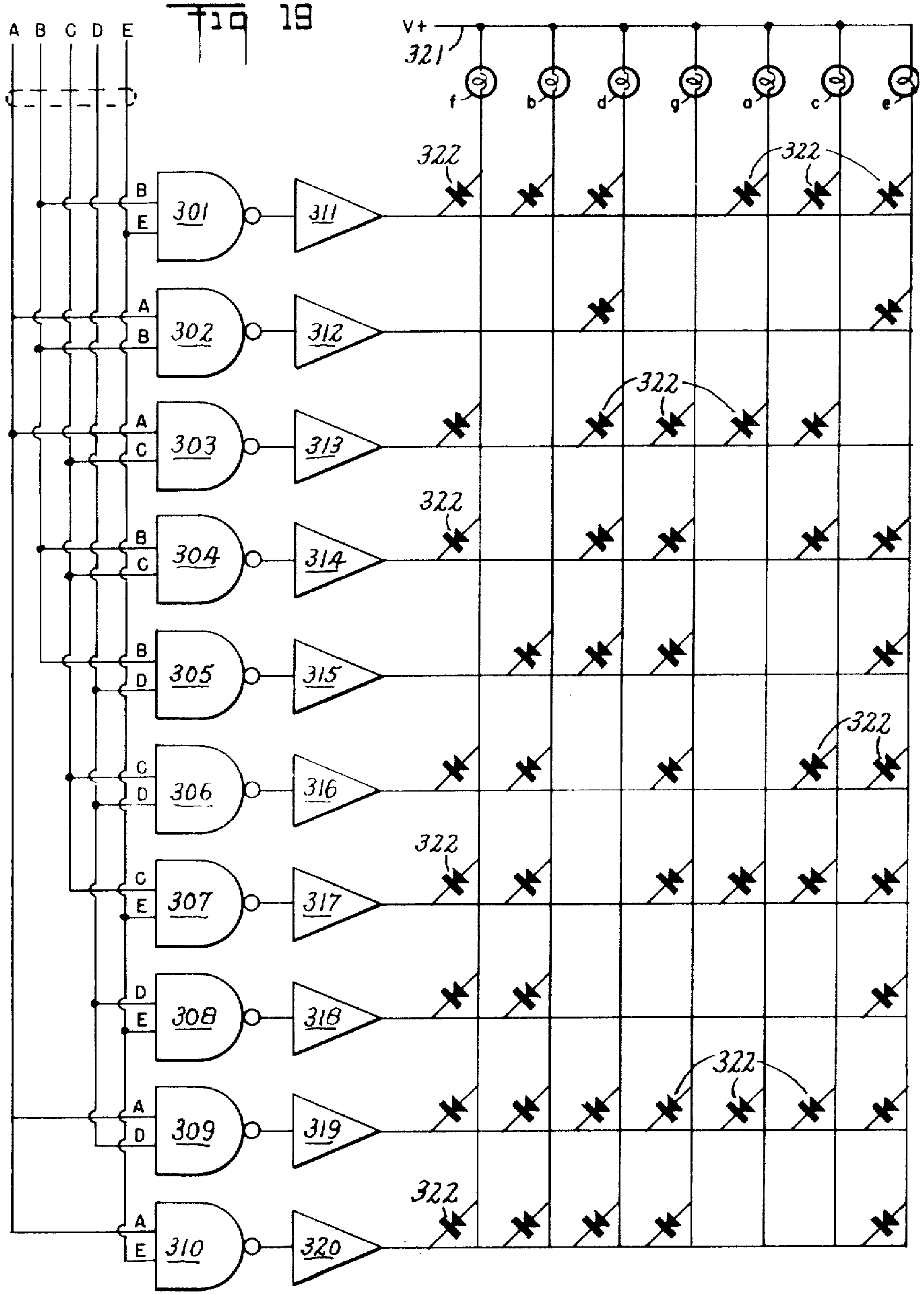
FIG. 19 is a detailed schematic diagram of the display and decoding sections of the control system.
Figure 20:
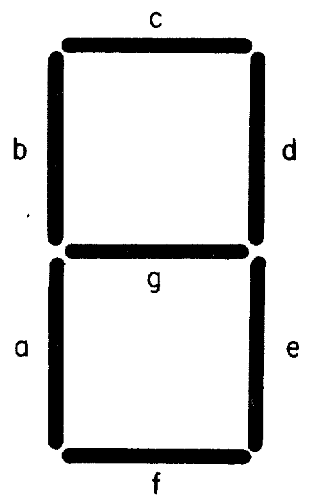
FIG. 20 is a front view of one window in the illuminated display showing the arrangement of seven illuminating seqments which form numerical characters as energized and selected by the decoding circuit of FIG. 19.
Figure 21:
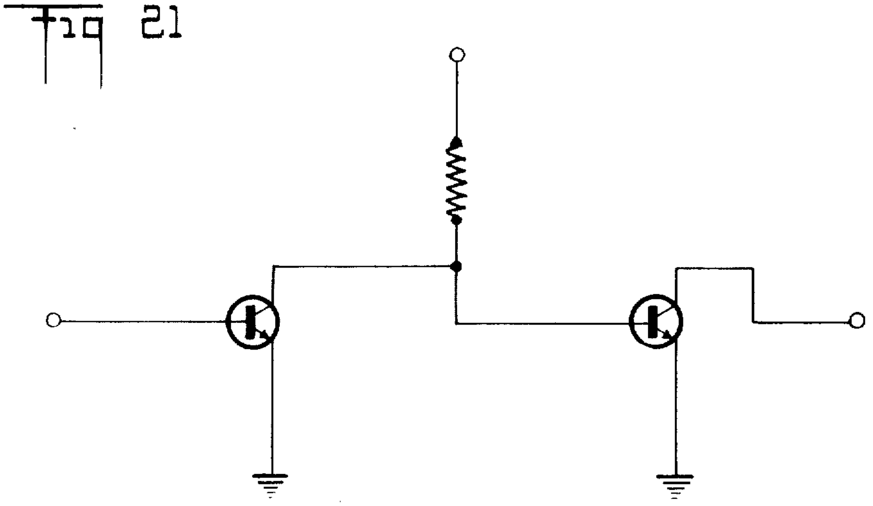
FIG. 21 is a schematic circuit diagram of a typical transistor amplifier as employed in the decoding section of FIG. 19.

Reference is now made to FIG. 19 showing input lines 401–405 which are connected to the output circuit of FIG. 18. Seven incandescent lamp segments respectively labeled, *f, b, d, g, a, c,* and *e* are connected to a decoding matrix of diodes 322 as shown. The lamp segments are physically arranged in double and adjacent squares having a common adjoining segment, as shown in FIG. 20, whereby numerical digits are formed by illumination of selected combinations of segments. The function of the circuit in FIG. 19 is that of a decoder which accepts input information in the form of two out of five binary code over lines 401–405 and provides a seven segment numerical display. The system as shown in FIG. 19 converts the two out of five binary input code back to a decimal code and then through amplifiers and diode gates actuates the incandescent lamps associated with the bars of the seven segment display module. The five input lines 401–405, are respectively labeled A, B, C, D, E in FIG. 19 to facilitate understanding the manner in which this decoder section operates. The input lines A through E are each connected to correspondingly labeled inpouts of ten dual input NAND gates 301 through 310 in the manner shown in FIG. 19 for the purpose of converting the two out of five code into a decimal numerical display. The outputs of NAND gates 301 through 310 are connected to the inputs of transistor amplifiers 311 through 320. The circuit of each of these amplifiers is shown in FIG. 21. The filaments symbolically shown at the top of FIG. 19 and identified by *f, b, d, g, a, c,* and *e* are the correspondingly lettered segments of the seven segment rectangular display as shown in FIG. 20. Such illuminated display devices are available commercially from Tungsol and others. A source of positive potential is connected to one side of all of the lamp segments via line 321 and the other side of selected segments are connected to ground through a matrix of diodes 322 connected as shown in FIG. 19 which converts the two out of five binary code into a ten place numerical display.

Figure 22:
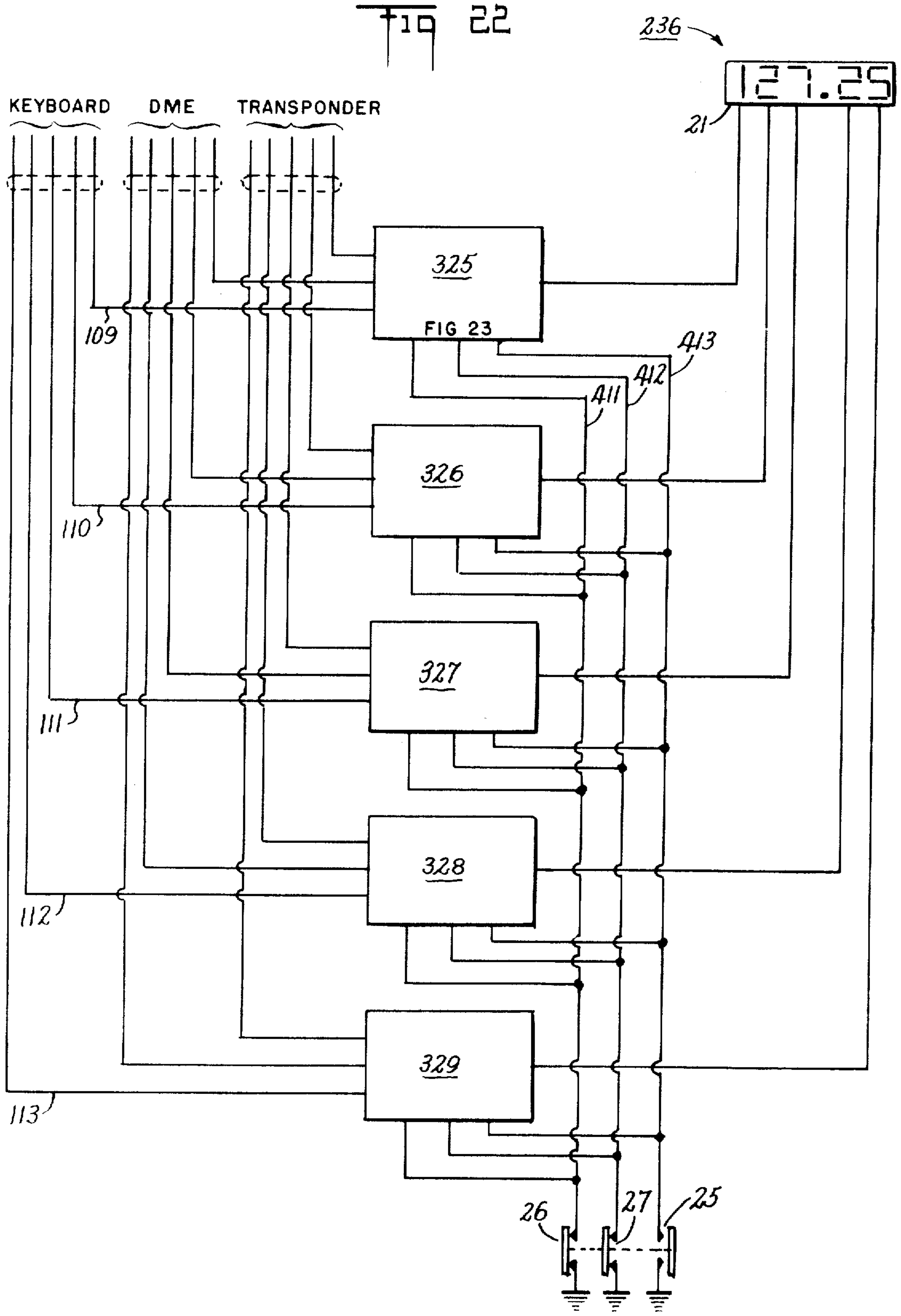
FIG. 22 is a schematic diagram of the display selection section of the control system of the invention.

Reference is now made to FIG. 22 of the drawings which is a schematic block diagram of the display selection circuit whereby the keyboard display window (21 in FIG. 1, indicated generally at 236 in FIG. 22) is enabled to serve as a common display for the keyboard storage, the distance measuring equipment (DME) and the transponder. The selection of which of these frequency settings will be displayed in window 236 (21 in FIG. 1) is accomplished by the three push buttons 25, 26, and 27 (also shown in FIG. 1) which select respectively the transponder, the keyboard, or DME. As shown in FIG. 22 the push buttons 25, 26 and 27 are interlocked in such manner that when any one is operated the other two are operated in the opposite sense. In FIG. 22 push button 25 has been operated to apply the transponder input information to the visual display indicated generally at 236. It will be recalled that the control circuit for each of the digital display positions was described hereinabove with reference to FIG. 19. The location of the display selection circuit shown in FIG. 22 within the overall system appears as block 62 in the overall block diagram of FIG. 4. Thus it is to be understood that the input lines in FIG. 22 marked number 1 "from keyboard" are actually the cable 61 in FIG. 4 comprising five each of five conductor cables making a total of 25 conductors. Similarly in FIG. 22 the number 2 input "from DME" corresponds to cable 77 in FIG. 4 while the input number 3 "from transponder" corresponds to cable 78 in FIG. 4. Operation of either of the interlocked push buttons 25, 26 or 27 as shown in FIG. 22 will remove ground from conductors 411, 412 or 413 to effect the display in the keyboard window (21 in FIG. 1) of, respectively, the transponder setting, the keyboard information, or the DME setting. As shown in FIG. 22 the circuit is connected to operate the transponder display. The five input select gates 325, 326, 327, 328 and 329 in FIG. 22 are all identical and their circuits are shown in detail by FIG. 23.

Figure 23:
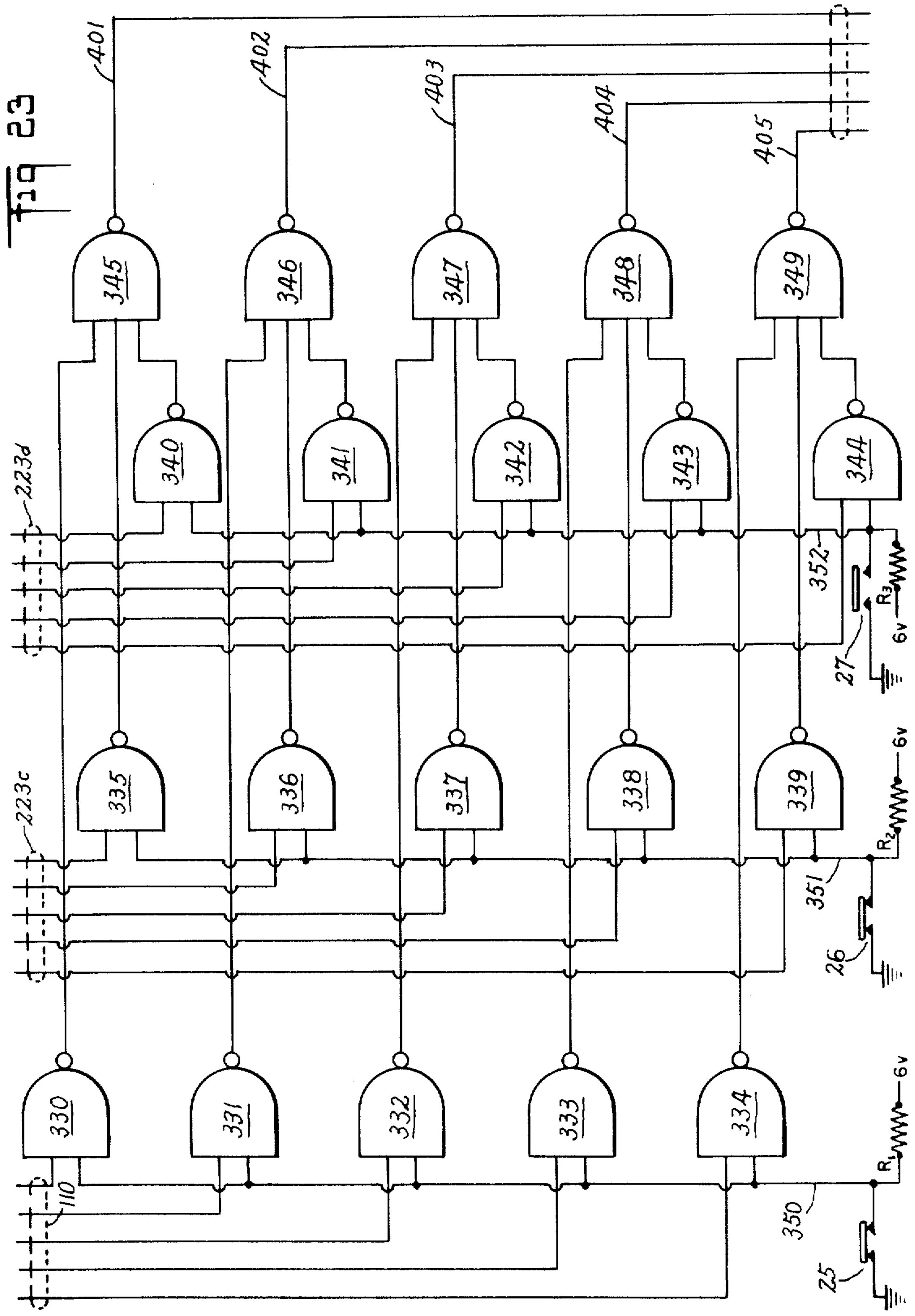
FIG. 23 is a detailed schematic diagram of one input select gate as employed in FIG. 22.

As shown in FIG. 23 each of the three input circuits of cable groups 61, 77 and 78, respectively identified as inputs number 1, number 2, and number 3, corresponding respectively to the keyboard, DME, and transponder, are connected into one input of negative AND gates such as 330 through 334 for input number 1, negative AND gates 335 through 339 connected to input number 2, and negative AND gates 340 through 344 connected to input number 3. The other input of each of the dual input negative AND gates 330 through 334 are all connected to a common line 350 which is grounded through push button 25 when closed as shown in FIG. 23, but to which positive potential is applied through resistor R1 when push button 25 is open.

Similarly the second input terminal of each of the dual input negative AND gates 335 through 339 is connected to common line 351 which is grounded through push button 26 when closed as shown in FIG. 23 but to which positive potential is applied through resistor R2 when push button 26 is open. In the same manner negative AND gates 340 through 344 have their second input terminals all connected to common line 352 to which positive potential is applied through resistor $R_3$ when push button switch 27 is open as shown in FIG. 23. Thus only the input information from input number 3, in the form of binary two out of five code, is able to pass through the dual input negative AND gates 340 through 344 and thence to the triple input negative AND gates 345 through 349 from whence the two out of five coded information passes over output lines 401 through 405 to the corresponding input lines of the display and decoding section heretofore described with reference to FIG. 19 of the drawings. This output information then determines the indication of one numerical digit in the seven segment display shown in FIG. 20. Five output select gates each identical with the circuit of FIG. 23, when connected together as shown by input select gates 325, 326, 327, 328 and 329 in FIG. 22 thus are enabled to produce and control a five digit display in the window indicated generally as 236 in FIG. 22, being the same display window designated by reference numeral 21 in the pictorial illustration of FIG. 1.

Having described in detail the switching system of the invention, its component elements, sub assemblies, and the manner in which the various parts and control sections of the system operate and cooperate to produce the desired result of remote push button digital tuning of a plurality of radio equipments, with selective numerical display of frequency settings, and with provision for instantaneous returning to a previously selected frequency, it will be appreciated that the system provides great flexibility of design and control. For example, the system may be simplified for the purpose of controlling fewer than the seven radio equipments disclosed as the preferred embodiment, or it may be expanded to provide control of a greater number of devices. The control and display system of the invention may also be extended to include such other aircraft or shipboard parameters as bearing, heading, fuel flow, altitutde, R.P.M., etc.

It will thus be seen that the subjects set forth above, among those made apparent from the preceding description, are efficiently attained, and since certain changes may be made in the above construction without departing from the scope of the invention, it is intended tha all matter contained in the above description or shown in the accompanying drawings shall be interpreted as illustrative and not in a limiting sense.

It is also to be understood that the following claims are intended to cover all of the generic and specific features of the invention which, as a matter of language, might be said to fall therebetween.

Having described our invention, what we claim as new and desire to secure by Letters Patent is:

1. A system for selectively controlling a plurality of instruments comprising in combination, A. a numerical keyboard, B. first digital storage means connected with said keyboard for recording and storing a number of successive digits as sequentially impressed upon said keyboard, C. digital display means connectable with said first storage means for visually displaying the sequence of digits stored in said first storage means, D. a plurality of second digital storage means each connected with one of said plurality of instruments for recording digital data thereat, E. selective transfer means for transferring the digits stored in said first storage means to any one of said selected second storage means, and F. a plurality of digitally controlled operating means, one of said means associated with each one of said plurality of instruments and operable in response to the sequence of digits recorded in said digital storage means associated with each said instrument to control that instrument so as to correspond to the digital data stored in its said storage means.

2. The combination of claim 1 including third digital storage means connectable with each of said instruments, switching means for transferring digital data from said second storage means to said third storage means, and further switching means for selectively connecting either said second or third storage means to said digital control means whereby said instrument is related to either of the digital data recorded in said second and third storage means.

3. In a digitally operated control system having operating means for controlling an instrumentality in response to digital data input, manually operable digit generating means, first digital storage means connected with said digit generating means, a second digital storage means connectable with said digit generating means, and a digital transfer switching circuit connectable with either said first or second digital storage means for transferring digital data stored therein to said operating means.

4. The combination of claim 3 and further means connectable with said digit generating means for displaying numerical digits in the order and sequence of their generation.

* * * * *

UNITED STATES PATENT OFFICE
CERTIFICATE OF CORRECTION

Patent No. 3,798,611 Dated March 19, 1974

Inventor(s) Reginald R. Gallant, Roger S. Swain and Neil S. Waterman

It is certified that error appears in the above-identified patent and that said Letters Patent are hereby corrected as shown below:

Column 1, line 61, "parallex" should be --parallax--. Column 2, line 6, after "tuned" change "in" to --is--. Column 3, line 10, "seqments" should be --segments--; line 65, "transfer" should be --transferred--. Column 5, line 37, "psuh" should be --push--. Column 7, line 21, "button" should be --buttons--. Column 8, line 13, after "10's," insert --1's--; line 26, "conductors" should be --conductor--; line 28, "section" should be --sections--; line 47, "naviation" should be --navigation--; line 53, "dme" should be --DME--; line 59, "contrl" should be --control--. Column 11, line 58, "204" should be --205--. Column 12, line 37, "are" should be --the--. Column 14, line 4, after "each" insert --set--; line 57, "dirven" should be --driven--. Column 15, line 20, "tiical" should be --tical--; line 64, "inpouts" should be --inputs--. Column 17, line 46, "Altitutde" should be --altitude--; line 47, "subjects" should be --objects--; line 52, "tha" should be --that--.

Signed and sealed this 15th day of October 1974.

(SEAL)
Attest:

McCOY M. GIBSON JR.
Attesting Officer

C. MARSHALL DANN
Commissioner of Patents

RM PO-1050 (10-69)

USCOMM-DC 60376-P69
☆ U.S. GOVERNMENT PRINTING OFFICE : 1969 O—366-334